US010212668B2

(12) United States Patent
Liu

(10) Patent No.: US 10,212,668 B2
(45) Date of Patent: Feb. 19, 2019

(54) METHOD FOR SENDING PREAMBLE SEQUENCE AND USER EQUIPMENT

(71) Applicant: Huawei Technologies Co., Ltd., Shenzhen, Guangdong (CN)

(72) Inventor: Deping Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/018,348

(22) Filed: Feb. 8, 2016

(65) Prior Publication Data
US 2016/0234787 A1 Aug. 11, 2016

Related U.S. Application Data

(63) Continuation of application No. PCT/CN2013/081411, filed on Aug. 13, 2013.

(51) Int. Cl.
H04W 52/06 (2009.01)
H04W 52/36 (2009.01)
H04W 52/50 (2009.01)
H04W 52/28 (2009.01)
H04W 52/32 (2009.01)
H04W 52/24 (2009.01)

(52) U.S. Cl.
CPC ........... H04W 52/06 (2013.01); H04W 52/28 (2013.01); H04W 52/367 (2013.01); H04W 52/50 (2013.01); H04W 52/242 (2013.01); H04W 52/325 (2013.01)

(58) Field of Classification Search
CPC ...... H04W 52/06; H04W 52/36; H04W 52/50
See application file for complete search history.

(56) References Cited

FOREIGN PATENT DOCUMENTS

| CN | 1549475 A | 11/2004 |
| CN | 102438306 A | 5/2012 |
| CN | 102984793 A | 3/2013 |
| CN | 103179654 A | 6/2013 |
| WO | 2011159207 A1 | 12/2011 |

OTHER PUBLICATIONS

"2msec TTI coverage extension", Nokia Siemens Networks, Nokia Corporation, 3GPP TSG-RAN WG2 Meeting #66, Apr. 4-8, 2009, 5 pages, R2-093071.
"3rd Generation Partnership Project; Technical Specification Group Radio Access Network; Evolved Universal Terrestrial Radio Access (E-UTRA); Physical layer procedures (Release 11)", 3GPP TS 36.213 V11.3.0, Jun. 2013, 176 pages.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.4.0, Jun. 2013, 346 pages.
(Continued)

Primary Examiner — Andrew Lai
Assistant Examiner — Leon Andrews

(57) ABSTRACT

A method for sending a preamble sequence and user equipment. The method includes determining a transmit power for sending a preamble sequence, where the transmit power meets a formula that takes into account a maximum transmit power of user equipment, a downlink power loss, and a target receive power of the preamble sequence. The method also includes sending the preamble sequence according to the determined transmit power.

20 Claims, 2 Drawing Sheets

(56) References Cited

OTHER PUBLICATIONS

"3rd Generation Partnership Project; Technical Specification Group Radio Access Network; Study on provisoon of low-cost Machine-Type Communications (MTC) User Equipments (UEs) based on LTE (Release 12)", 3GPP TR 36.888 V12.0.0, Jun. 2013, 55 pages.
"3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.0.0 (Jul. 2013), Jul. 2013, total 450 pages.
3rd Generation Partnership Project; Technical Specification Group Radio Access Network; Evolved Universal Terrestrial Radio Access (E-UTRA); Physical Channels and Modulation (Release 11), 3GPP TS 36.211 V11.3.0 (Jun. 2013), Jun. 2013, total 110 pages.
3rd Generation Partnership Project; Technical Specification Group Radio Access Network; Evolved Universal Terrestrial Radio Access (E-UTRA); Medium Access Control (MAC) protocol specification (Release 11), 3GPP Ts 36.321 V11.3,0 (Jun. 2013), Jun. 2013, total 57 pages.

METHOD FOR SENDING PREAMBLE SEQUENCE AND USER EQUIPMENT

CROSS-REFERENCE TO RELATED APPLICATIONS

This application is a continuation of International Application No. PCT/CN2013/081411, filed on Aug. 13, 2013, which is hereby incorporated by reference in its entirety.

TECHNICAL FIELD

The present invention relates to the field of communications technologies, and in particular, to a method for sending a preamble sequence and user equipment.

BACKGROUND

The Internet of Things is referred to as machine to machine (Machine to Machine, M2M) for short, and was first proposed in 1999. A definition is relatively simple: All objects are connected to the Internet by using information sensing devices, so as to implement smart identification and management. The objects are combined with the Internet, which can implement remote perception and control of all the objects; therefore, a smarter production and living system is generated. The Internet of Things is larger than the existing Internet, and is widely applied to multiple fields, such as a smart grid, intelligent transportation, environment protection, government work, public security, smart home furnishing, intelligent firefighting, industrial monitoring, elderly caring, and personal health.

The standardization organization 3rd generation partnership project (3GPP) dedicatedly founded a project team that studies enhancements and optimization that need to be made to a mobile communication network because of introduction of an machine type communication (MTC) device. Vodafone (Vodafone) proposes that, many M2M devices, such as an electric meter, may be placed at a location in which coverage is relatively poor, such as a basement, and these devices may need a coverage enhancement amount of 20 dB to meet a requirement. Even if user equipment sends a sequence always by using a maximum transmit power, a power received by a target base station still cannot reach a target receive power, and even is far lower than the target receive power. In this case, the user equipment may transmit a sequence at multiple transmission time intervals (TTI, Transmission Time interval), or transmit a sequence in multiple subframes (subframe), so as to achieve an effect of repeated sending. On a base station side, these sequences are collected and combined, so as to achieve an objective of improving a receive signal to noise ratio. For example:

| Quantity of transmission time intervals (#TTI) | Coverage enhancement amount (dB) |
|---|---|
| 1 | 0 (reference for comparison) |
| 2 | 3 |
| 4 | 5 |

There is a correspondence between a repetition count, that is, a quantity of occupied transmission time intervals, and information about a corresponding coverage enhancement amount (dB). This correspondence may be predefined after being obtained by means of mathematic calculation or in an emulation manner. Actual coverage statuses of user equipments differ greatly, not all users that need coverage enhancement need compensation as large as 20 dB, and an actual case is that the coverage enhancement amount may be an amount from 0 dB to 20 dB. In addition, quantities of transmission time intervals needed by user equipments that need different coverage enhancement amounts are different. User equipment that needs less coverage enhancement needs fewer transmission time intervals because needed coverage enhancement compensation may be obtained in a shorter accumulated time. Therefore, user equipments that need different coverage enhancements may be grouped, so that user equipments that need equal or close coverage enhancement amounts are clustered to form a group and use a same repetition count. In this way, a range that is from a coverage enhancement amount of 0 dB to a coverage enhancement amount of 20 dB may be divided into several groups, such as [5 dB, 10 dB, 15 dB, 20 dB]. Certainly, a system may also indiscriminately provide only one coverage enhancement amount, such as 15 dB or 20 dB.

In the prior art, to access a radio communications system, user equipment first performs a cell searching process to search for all possible cells and find an appropriate cell, and then performs a random access process to access a found target cell. After finding the appropriate cell and establishing downlink synchronization, the user equipment receives system information from a base station serving the target cell, where the system information includes a target receive power for transmitting a preamble sequence (preamble) in an uplink random access process to be performed by a UE.

When the base station receives at the same time signals sent by two user equipments from which distances to the base station are different, and because a signal of user equipment closer to the base station is relatively strong, and a signal of user equipment farther from the base station is relatively weak, the strong signal of the user equipment closer to the base station severely interferes with the signal of the other user equipment, that is, a near-far effect (near-far effect). A method for resolving this problem is: adjusting in real time transmit powers of the user equipments according to different communication distances, that is, power control is performed. When the user equipment initiates the uplink random access process to access the target base station, a transmit power of the preamble sequence is determined according to a target receive power of the preamble sequence and an uplink path loss (PL, path loss) between the user equipment and the target base station. The uplink PL may be obtained by estimating according to a downlink path loss that is between the target base station and the user equipment and is measured by the user equipment.

If a same coverage enhancement resource is provided in a system, users that need coverage enhancement all use a same quantity of coverage enhancement repetitions (a quantity of transmission time intervals). For example, a coverage enhancement of 15 dB is corresponding to 100 times of repeated transmissions (100 transmission time intervals). However, actual coverage enhancements needed by the user equipments are different. Because uplink path losses are different, some user equipments need only a relatively small coverage enhancement, for example, only 5 dB may meet a requirement of a target receive power; some user equipments need a relatively large coverage enhancement value so that the target receive power can be reached. If uplink path losses of user equipment 1 and user equipment 2 are different, an uplink path loss of the user equipment 1 is small and a coverage enhancement of 5 dB is needed, an uplink path loss of the user equipment 2 is large and a coverage enhancement of 15 dB is needed, and both the user equipment 1 and the user equipment 2 perform transmission by using a maximum transmit power, powers that are received at each transmission time interval by the target base station from the user equipment 1 and the user equipment 2 are also different, and the near-far effect appears at each transmission time interval. When the user equipment 1 and the user equipment 2 perform repeated transmission by using a same transmission time interval, accumulated total receive powers that are of the user equipment 1 and the user equipment 2 and are collected on a base station side are also different. If a total receive power accumulated after the user equipment 2 performs repeated transmission may exactly meet the requirement of the target receive power, a total receive power accumulated after the user equipment 1 performs repeated transmission is 10 dB (15 dB-5 dB) more than the target receive power. It can be learned that for the target base station, in addition to impact of normal receiving of the user equipment 2 due to the near-far effect, a receive power of the user equipment 1 is 10 dB higher than the target receive power, thereby greatly wasting a transmit power of the user equipment 1.

SUMMARY

Implementation manners of the present invention provide a method for sending a preamble sequence and user equipment, so that a problem of a near-far effect that appears at a target base station when different user equipments repeatedly send a sequence can be avoided, and a transmit power of user equipment is reduced; in addition, a problem of setting a transmit power when coverage enhancement user equipment performs power ramping is also resolved.

According to a first aspect, a method for sending a preamble sequence is provided, where the method includes: determining a transmit power for sending a preamble sequence, where the transmit power meets the following formula: Power=min{Pmax,PREAMBLE_RECEIVED_TARGET_POWER$_i^{preamble\_transmission\_counter}$+PL}, where Power is the determined transmit power, Pmax is a maximum transmit power of user equipment, PL is an uplink path loss and is obtained by estimating according to a downlink path loss, and PREAMBLE_RECEIVED_TARGET_POWER$_i^{preamble\_transmission\_counter}$ is a target receive power of the preamble sequence, where PREAMBLE_RECEIVED_TARGET_POWER$_i^{preamble\_transmission\_counter}$=preambleInitialReceivedTargetPower+DELTA_PREAMBLE−$X_i$+(preamble_transmission_counter−1)*powerRampingStep, and preambleInitialReceivedTargetPower is an initial target receive power of the preamble sequence, DELTA_PREAMBLE is a power offset based on a format of the preamble sequence, powerRampingStep is a power ramp step, preamble_transmission_counter is a repetition count for transmitting the preamble sequence, and $X_i$ is a power offset corresponding to a preamble sequence resource pool i for coverage enhancement random access; and sending the preamble sequence according to the determined transmit power.

With reference to the first aspect, in a first possible implementation manner of the first aspect, the power offset $X_i$ meets PREAMBLE_RECEIVED_TARGET_POWER$_i^{preamble\_transmission\_counter}$+PL−Pmax≤Δ, where Δ≥0, and Δ is a constant and a preset threshold.

With reference to the first implementation manner of the first aspect, in a second possible implementation manner of the first aspect, the method further includes: determining the power offset $X_i$, where the determining the power offset $X_i$ includes: searching for the power offset $X_i$ in ascending order of power offsets, or searching for the power offset $X_i$ in ascending order of repetition counts for transmitting the preamble sequence.

With reference to the first implementation manner or the second implementation manner of the first aspect, in a third possible implementation manner of the first aspect, the sending the preamble sequence includes: transmitting the preamble sequence by using a repetition count corresponding to the preamble sequence resource pool i for coverage enhancement random access.

With reference to the first implementation manner, the second implementation manner, or the third implementation manner of the first aspect, in a fourth possible implementation manner of the first aspect, the determined transmit power is PREAMBLE_RECEIVED_TARGET_POWER$_i^{preamble\_transmission\_counter}$+PL.

With reference to the first implementation manner, the second implementation manner, the third implementation manner, or the fourth implementation manner of the first aspect, in a fifth possible implementation manner of the first aspect, the power offset $X_i$ is a coverage enhancement amount that is corresponding to the repetition count corresponding to the preamble sequence resource pool i for coverage enhancement random access.

With reference to the first implementation manner, the second implementation manner, the third implementation manner, the fourth implementation manner, or the fifth manner of the first aspect, in a sixth possible implementation manner of the first aspect, the determining a transmit power for sending a preamble sequence includes: obtaining PREAMBLE_RECEIVED_TARGET_POWER$_i^{preamble\_transmission\_counter}$ by performing calculation according to the power offset $X_i$ and sending the preamble sequence according to PREAMBLE_RECEIVED_TARGET_POWER$_i^{preamble\_transmission\_counter}$, to perform the preamble_transmission_counter$^{th}$ random access;

if the preamble_transmission_counter$^{th}$ random access fails, increasing preamble_transmission_counter by one, keeping $X_i$ unchanged, and calculating the following again:

PREAMBLE_RECEIVED_TARGET_POWER$_i^{preamble\_transmission\_counter}$; and if a condition that PREAMBLE_RECEIVED_TARGET_POWER$_i^{preamble\_transmission\_counter}$+PL−Pmax≤Δ is met, performing transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if a condition that PREAMBLE_RECEIVED_TARGET_POWER$_i^{preamble\_transmission\_counter}$+PL−Pmax≤Δ is not met, searching for the power offset $X_i$ in ascending order of repetition counts or the power offsets $X_j$, and determining whether the found power offset $X_j$ meets PREAMBLE_RECEIVED_TARGET_POWER$_i^{preamble\_transmission\_counter}$+PL−Pmax≤Δ; and if a minimum value of $X_i$ that meets the foregoing formula is found, performing transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if the foregoing inequality cannot be met after all $X_i$ are traversed, performing transmission by using a repetition count corresponding to a preamble sequence resource pool i for coverage enhancement random access that is found at last, where the transmit power is Pmax.

With reference to the first aspect, the first implementation manner, the second implementation manner, the third implementation manner, the fourth implementation manner, the fifth implementation manner, or the sixth implementation manner, of the first aspect, in a seventh possible implementation manner of the first aspect, information about the preamble sequence resource pool i for coverage enhancement random access is obtained from system information, or is preset.

With reference to the seventh possible implementation manner of the first aspect, in an eighth possible implementation manner of the first aspect, the information about the preamble sequence resource pool i for coverage enhancement random access includes at least one type of the following information: the repetition count corresponding to the preamble sequence resource pool i for coverage enhancement random access and a coverage enhancement amount corresponding to the preamble sequence resource pool i for coverage enhancement random access.

According to a second aspect, user equipment is provided, where the user equipment includes: a determining module, configured to determine a transmit power for sending a preamble sequence, where the transmit power meets the following formula: Power=min{Pmax,PREAMBLE_RECEIVED_TARGET_POWER$_i^{preamble\_transmission\_counter}$+PL}, where Power is the determined transmit power, Pmax is a maximum transmit power of the user equipment, PL is an uplink path loss and is obtained by estimating according to a downlink path loss, and PREAMBLE_RECEIVED_TARGET_POWER$_i^{preamble\_transmission\_counter}$ is a target receive power of the preamble sequence, where PREAMBLE_RECEIVED_TARGET_POWER$_i^{preamble\_transmission\_counter}$=preambleInitialReceivedTargetPower+DELTA_PREAMBLE−$X_i$+(preamble_transmission_counter−1)*powerRampingStep, and preambleInitialReceivedTargetPower is an initial target receive power of the preamble sequence, DELTA_PREAMBLE is a power offset based on a format of the preamble sequence, powerRampingStep is a power ramp step, preamble_transmission_counter is a repetition count for transmitting the preamble sequence, and $X_i$ is a power offset corresponding to a preamble sequence resource pool i for coverage enhancement random access; and a sending module, configured to send the preamble sequence according to the determined transmit power.

With reference to the implementation manner of the second aspect, in a first possible implementation manner of the second aspect, the power offset $X_i$ meets PREAMBLE_RECEIVED_TARGET_POWER$_i^{preamble\_transmission\_counter}$+PL−Pmax≤Δ, where Δ≥0, and Δ is a constant and a preset threshold.

With reference to the first implementation manner of the second aspect, in a second possible implementation manner of the second aspect, the determining module is further configured to search for the power offset $X_i$ in ascending order of power offsets, or search for the power offset $X_i$ in ascending order of repetition counts for transmitting the preamble sequence.

With reference to the first implementation manner or the second implementation manner of the second aspect, in a third possible implementation manner of the second aspect, the sending module is further configured to transmit the preamble sequence by using a repetition count corresponding to the preamble sequence resource pool for coverage enhancement random access.

With reference to the first implementation manner, the second implementation manner, or the third implementation manner of the second aspect, in a fourth possible implementation manner of the second aspect, the determined transmit power is PREAMBLE_RECEIVED_TARGET_POWER$_i^{preamble\_transmission\_counter}$+PL.

With reference to the first implementation manner, the second implementation manner, the third implementation manner, or the fourth implementation manner of the second aspect, in a fifth possible implementation manner of the second aspect, the power offset $X_i$ is a coverage enhancement amount that is corresponding to the repetition count corresponding to the preamble sequence resource pool i for coverage enhancement random access.

With reference to the first implementation manner, the second implementation manner, the third implementation manner, the fourth implementation manner, or the fifth manner of the second aspect, in a sixth possible implementation manner of the second aspect, the determining module is specifically configured to obtain PREAMBLE_RECEIVED_TARGET_POWER$_i^{preamble\_transmission\_counter}$ by performing calculation according to the power offset $X_i$, and send the preamble sequence according to PREAMBLE_RECEIVED_TARGET_POWER$_i^{preamble\_transmission\_counter}$, to perform the preamble_transmission_counter$^{th}$ random access;

if the preamble_transmission_counter$^{th}$ random access fails, increase preamble_transmission_counter$^{th}$ one, keep $X_i$ unchanged, and calculate the following again:
PREAMBLE_RECEIVED_TARGET_POWER$_i^{preamble\_transmission\_counter}$; and if a condition that PREAMBLE_RECEIVED_TARGET_POWER$_i^{preamble\_transmission\_counter}$+PL−Pmax≤Δ is met, perform transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if a condition that PREAMBLE_RECEIVED_TARGET_POWER$_i^{preamble\_transmission\_counter}$+PL−Pmax≤Δ is not met, search for the power offset $X_i$ in ascending order of repetition counts or the power offsets $X_i$, and determine whether the found power offset $X_i$ meets PREAMBLE_RECEIVED_TARGET_POWER$_i^{preamble\_transmission\_counter}$+PL−Pmax≤Δ; and if a minimum value of $X_i$ that meets the foregoing formula is found, perform transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if the foregoing inequality cannot be met after all $X_i$ are traversed, perform transmission by using a repetition count corresponding to a preamble sequence resource pool i for coverage enhancement random access that is found at last, where the transmit power is Pmax.

With reference to the second aspect, the first implementation manner, the second implementation manner, the third implementation manner, the fourth implementation manner, or the fifth manner, in a seventh possible implementation manner of the second aspect, information about the preamble sequence resource pool i for coverage enhancement random access is obtained from system information, or is preset.

With reference to the seventh possible implementation manner of the second aspect, in an eighth possible implementation manner of the second aspect, the information about the preamble sequence resource pool i for coverage enhancement random access includes at least one type of the following information: the repetition count corresponding to the preamble sequence resource pool i for coverage enhancement random access and a coverage enhancement amount corresponding to the preamble sequence resource pool i for coverage enhancement random access.

According to a third aspect, user equipment is provided, including a processor and a sender, where the processor is configured to execute the following operation by invoking an operation instruction: determining a transmit power for sending a preamble sequence, where the transmit power meets the following formula: Power=min{Pmax,PREAMBLE_RECEIVED_TARGET_POWER$_i^{preamble\_transmission\_counter}$+PL}, where Power is the determined transmit power, Pmax is a maximum transmit power of the user equipment, PL is an uplink path loss and is obtained by estimating according to a downlink path loss, and PREAMBLE_RECEIVED_TARGET_POWER$_i^{preamble\_transmission\_counter}$ is a target receive power of the preamble sequence, where PREAMBLE_RECEIVED_TARGET_POWER$_i^{preamble\_transmission\_counter}$=preambleInitialReceivedTargetPower+DELTA_PREAMBLE−$X_i$+(preamble_transmission_counter−1)*powerRampingStep, and preambleInitialReceivedTargetPower is an initial target receive power of the preamble sequence, DELTA_PREAMBLE is a power offset based on a format of the preamble sequence, powerRampingStep is a power ramp step, preamble_transmission_counter is a repetition count for transmitting the preamble sequence, and $X_i$ is a power offset corresponding to a preamble sequence resource pool i for coverage enhancement random access; and the sender is configured to send the preamble sequence according to the determined transmit power.

With reference to the implementation manner of the third aspect, in a first possible implementation manner of the third aspect, the power offset $X_i$ meets PREAMBLE_RECEIVED_TARGET_POWER$_i^{preamble\_transmission\_counter}$+PL−Pmax≤Δ, where Δ≥0, and Δ is a constant and a preset threshold.

With reference to the first implementation manner of the third aspect, in a second possible implementation manner of the third aspect, the processor is further configured to search for the power offset $X_i$ in ascending order of power offsets, or search for the power offset $X_i$ in ascending order of repetition counts for transmitting the preamble sequence.

With reference to the first implementation manner or the second implementation manner of the third aspect, in a third possible implementation manner of the third aspect, the sender is further configured to transmit the preamble sequence by using a repetition count corresponding to the preamble sequence resource pool i for coverage enhancement random access.

With reference to the first implementation manner, the second implementation manner, or the third implementation manner of the third aspect, in a fourth possible implementation manner of the third aspect, the determined transmit power is PREAMBLE_RECEIVED_TARGET_POWER$_i^{preamble\_transmission\_counter}$+PL.

With reference to the first implementation manner, the second implementation manner, the third implementation manner, or the fourth implementation manner of the third aspect, in a fifth possible implementation manner of the third aspect, the power offset $X_i$ is a coverage enhancement amount that is corresponding to the repetition count corresponding to the preamble sequence resource pool i for coverage enhancement random access.

With reference to the first implementation manner, the second implementation manner, the third implementation manner, the fourth implementation manner, or the fifth manner of the third aspect, in a sixth possible implementation manner of the third aspect, the processor is specifically configured to obtain PREAMBLE_RECEIVED_TARGET_POWER$_i^{preamble\_transmission\_counter}$ by performing calculation according to the power offset $X_i$, and send the preamble sequence according to PREAMBLE_RECEIVED_TARGET_POWER$_i^{preamble\_transmission\_counter}$, to perform the preamble_transmission_counter$^{th}$ random access;

if the preamble_transmission_counter$^{th}$ random access fails, increase preamble_transmission_counter by one, keep $X_i$ unchanged, and calculate the following again:
PREAMBLE_RECEIVED_TARGET_POWER$_i^{preamble\_transmission\_counter}$; and if a condition that PREAMBLE_RECEIVED_TARGET_POWER$_i^{preamble\_transmission\_counter}$+PL−Pmax≤Δ is met, perform transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if a condition that PREAMBLE_RECEIVED_TARGET_POWER$_i^{preamble\_transmission\_counter}$+PL−Pmax≤Δ is not met, search for the power offset $X_i$ in ascending order of repetition counts or the power offsets $X_i$, and determine whether the found power offset $X_i$ meets PREAMBLE_RECEIVED_TARGET_POWER$_i^{preamble\_transmission\_counter}$+PL−Pmax≤Δ; and if a minimum value of $X_i$ that meets the foregoing formula is found, perform transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if the foregoing inequality cannot be met after all $X_i$ are traversed, perform transmission by using a repetition count corresponding to a preamble sequence resource pool i for coverage enhancement random access that is found at last, where the transmit power is Pmax.

With reference to the third aspect, the first implementation manner, the second implementation manner, the third implementation manner, the fourth implementation manner, or the fifth manner, in a seventh possible implementation manner of the third aspect, information about the preamble sequence resource pool i for coverage enhancement random access is obtained from system information, or is preset.

With reference to the seventh possible implementation manner of the third aspect, in an eighth possible implementation manner of the third aspect, the information about the preamble sequence resource pool i for coverage enhancement random access includes at least one type of the following information: the repetition count corresponding to the preamble sequence resource pool i for coverage enhancement random access and a coverage enhancement amount corresponding to the preamble sequence resource pool i for coverage enhancement random access.

Beneficial effects in the implementation manners of the present invention are as follows: When user equipment performs transmission by using a preamble sequence resource pool for coverage enhancement random access, during transmit power calculation, a power offset is introduced, that is, a power gain brought by means of repeated transmission performed by using the preamble sequence resource pool for coverage enhancement random access is introduced, and the gain is converted for the transmit power calculation. Because the repeated transmission itself brings a coverage enhancement amount X dB, when a target receive power of a preamble sequence is calculated, the gain is deducted, and PREAMBLE_RECEIVED_TARGET_

POWER=preambleInitialReceivedTargetPower+DELTA_PREAMBLE-$X_i$+(preamble_transmission_counter-1)*powerRampingStep, that is, the target receive power of the preamble sequence may be correspondingly decreased by X dB. After such calculation is performed, according to the prior art, PREAMBLE_RECEIVED_TARGET_POWER+PL is also correspondingly decreased by X dB, and a transmit power Power=min{Pmax,PREAMBLE_RECEIVED_TARGET_POWER+PL} [dbm] is calculated. For user equipments whose coverage enhancement requirements are less than or equal to X dB, that is, all users who meet PREAMBLE_RECEIVED_TARGET_POWER+PL-Pmax≤X, because PREAMBLE_RECEIVED_TARGET_POWER+PL has been correspondingly decreased by X dB, in this case, PREAMBLE_RECEIVED_TARGET_POWER+PL is less than Pmax, that is, according to calculation of the formula, a transmit power is PREAMBLE_RECEIVED_TARGET_POWER+PL. In this way, it may be ensured that receive powers received on a base station side are close to each other and are PREAMBLE_RECEIVED_TARGET_POWER, thereby overcoming a near-far effect. Likewise, all user equipments whose coverage enhancement requirements are less than or equal to X dB perform transmission according to the transmit power: PREAMBLE_RECEIVED_TARGET_POWER+PL, so that a path loss is overcome, a same target receive power is achieved, and no power is wasted.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

The following describes the present invention in detail with reference to the accompanying drawings and implementation manners.

Figure 1:
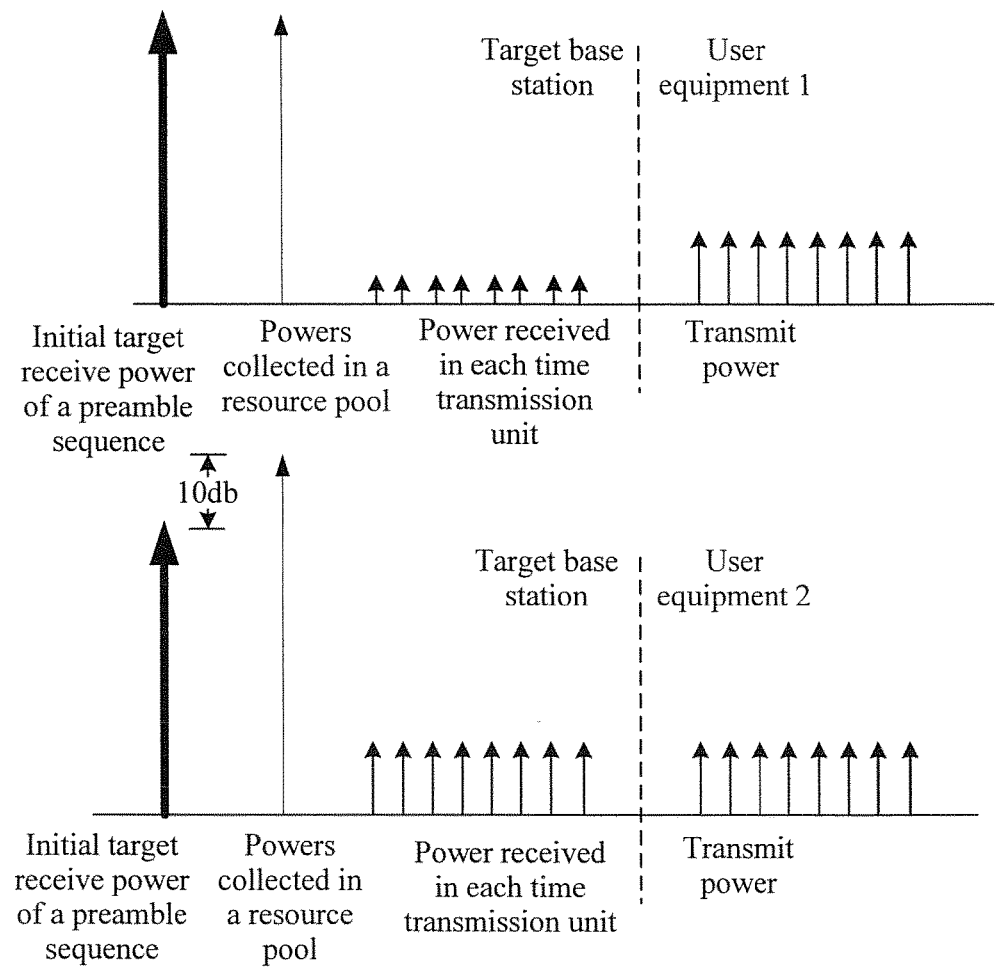
FIG. 1 is a schematic diagram in which in the prior art, user equipment repeatedly sends a sequence, and powers collected in a corresponding resource pool by a target base station are different.
Figure 2:
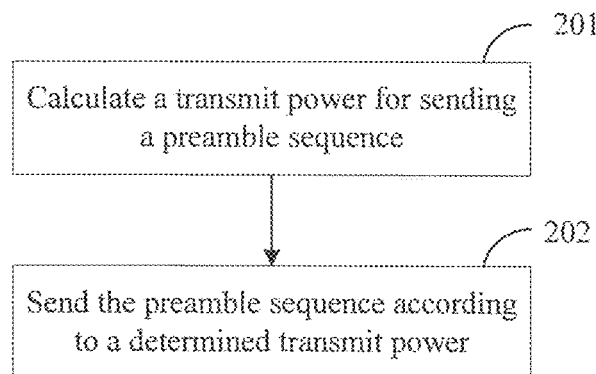
FIG. 2 is a flowchart of an implementation manner of a method for sending a preamble sequence according to the present invention.

Referring to FIG. 2, FIG. 2 is a flowchart of an implementation manner of the method sending a preamble sequence according to the present invention. As shown in FIG. 2, the method includes the following steps:

Step 201: Determine a transmit power for sending a preamble sequence, where the transmit power is as follows:

Power=min{$P$max,PREAMBLE_RECEIVED_TARGET_POWER$_i^{preamble\_transmission\_counter}$+PL}

Power is the determined transmit power, Pmax is a maximum transmit power of user equipment, PL is a path loss value obtained by estimating according to a downlink path loss, and PREAMBLE_RECEIVED_TARGET_POWER$_i^{preamble\_transmission\_counter}$ is a target receive power of the preamble sequence, where PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep.

preambleInitialReceivedTargetPower is an initial target receive power of the preamble sequence, where the initial target receive power of the preamble sequence may be notified by a target base station by using system information, and the initial target receive power preambleInitialReceivedTargetPower of the preamble sequence may be set to -120 dBm, -118 dBm, -116 dBm, or the like. DELTA_PREAMBLE is a power offset based on a format of the preamble sequence, and values are shown in the following table:

| Values of DELTA_PREAMBLE | |
| --- | --- |
| Format of a preamble sequence | Value of DELTA_PREAMBLE |
| 0 | 0 dB |
| 1 | 0 dB |
| 2 | -3 dB |
| 3 | -3 dB |
| 4 | 8 dB |

$X_i$ is a power offset corresponding to a preamble sequence resource pool i for coverage enhancement random access. preamble_transmission_counter is a repetition count for transmitting the preamble sequence, where preamble_transmission_counter ∈ {1, 2, ..., preambleTransMax} and is set to 1 during initial access, and preambleTransMax is a system parameter and is a maximum transmission count of the preamble sequence. powerRampingStep is a power ramp step, where the power ramp step may be notified by the target base station by using the system information, and the power ramp step powerRampingStep that is of the preamble sequence and is broadcast by the target base station may be set to 0 dB, 2 dB, 4 dB, 6 dB, or the like.

It can be learned from the foregoing MIN formula that, when PREAMBLE_RECEIVED_TARGET_POWER$_i^{preamble\_transmission\_counter}$+PL is less than Pmax, a transmit power value of the preamble sequence of the user equipment is set to PREAMBLE_RECEIVED_TARGET_POWER$_i^{preamble\_transmission\_counter}$+PL; otherwise, a transmit power value of the preamble sequence of the user equipment is set to Pmax.

For $X_i$, it should further be noted that, information that is used for a preamble sequence resource pool for coverage enhancement random access and is set by the base station includes a corresponding repetition count (that is, occupied transmission time intervals) and/or information about a corresponding coverage enhancement amount (dB), and may be obtained by notifying the system information of the base station, or may be obtained in a predefined manner. The information about the preamble sequence resource pool for coverage enhancement random access includes the corresponding repetition count R, that is, a quantity of the occupied transmission time intervals, and/or the information X about the corresponding coverage enhancement amount (dB), and there is a correspondence between the repetition count, that is, the quantity of the occupied transmission time intervals, corresponding to the preamble sequence resource pool for coverage enhancement random access, and the corresponding coverage enhancement amount (dB). Therefore, the information can still be finally obtained even if the information about the coverage enhancement amount (dB) does not exist.

The power offset $X_i$ is a coverage enhancement amount corresponding to the preamble sequence resource pool i for coverage enhancement random access, or the power offset $X_i$ is a coverage enhancement amount that is corresponding to the repetition count, that is, occupied transmission time intervals, corresponding to the preamble sequence resource pool i for coverage enhancement random access. Further, the power offset $X_i$ is obtained from the information about the preamble sequence resource pool for coverage enhancement random access, where the information about the preamble sequence resource pool for coverage enhancement random access is obtained by notifying the system information, or is obtained in a manner predefined by a current device.

In an implementation manner of the present invention, the target receive power preambleInitialReceivedTargetPower, in the system information, of the preamble sequence resource pool for coverage enhancement random access may be defined, so that the target receive power includes the coverage enhancement amount X dB. For example, for common user equipment, an initial target receive power of a preamble sequence resource pool for random access is preambleInitialReceivedTargetPower and a target receive power of a preamble sequence resource pool for coverage enhancement random access is preambleInitialReceivedTargetPower−X where X is a power offset; then:

PREAMBLE_RECEIVED_TARGET_
POWER=preambleInitialReceivedTargetPower+
DELTA_PREAMBLE+(preamble_transmission_
counter−1)*powerRampingStep.

In another implementation of the present invention, if the initial target receive power that is of the preamble sequence and is broadcast by a system is preambleInitialReceivedTargetPower, the target receive power of the preamble sequence resource pool for coverage enhancement random access is as follows:

PREAMBLE_RECEIVED_TARGET_
POWER=preambleInitialReceivedTargetPower+
DELTA_PREAMBLE+(preamble_transmission_
counter−1)*powerRampingStep.

In this case, the power offset X is a coverage enhancement amount. The user equipment needs to use the preamble sequence resource pool for coverage enhancement random access; and a transmit power of the user equipment at each transmission time interval is: Power=min{Pmax,PREAMBLE_RECEIVED_TARGET_POWER+PL} [dBm], where min{ } is a MIN function, and Pmax is the maximum transmit power of the user equipment.

PREAMBLE_RECEIVED_TARGET_POWER is the target receive power of the preamble sequence resource pool.

X is the power offset corresponding to the preamble sequence resource pool, that is, the coverage enhancement amount (dB).

PL is a path loss value obtained by estimating according to the downlink path loss. More generally, the base station may set N preamble sequence resource pools for coverage enhancement random access, where N is a positive integer. Each preamble sequence resource pool for coverage enhancement random access includes a corresponding repetition count, that is, occupied transmission time intervals, and/or information about a corresponding coverage enhancement amount (dB) that is represented by $X_i$, where $i \in \{1, \ldots, N\}$, that is, there are at least two power offsets $X_i$. For ease of description, the preamble sequence resource pool for coverage enhancement random access is referred to as a preamble sequence resource pool for short in the following.

If the initial target receive power of the preamble sequence of a system is preambleInitialReceivedTargetPower, a target receive power of the $i^{th}$ preamble sequence resource pool for coverage enhancement random access is as follows:

PREAMBLE_RECEIVED_TARGET_
POWER=preambleInitialReceivedTargetPower+
DELTA_PREAMBLE−$X_i$+(preamble_transmission_counter−1)*powerRampingStep.

It is assumed that there are N preamble sequence resource pools for coverage enhancement random access in the system, where N is a positive integer. From the first preamble sequence resource pool for coverage enhancement random access to the $N^{th}$ preamble sequence resource pool for coverage enhancement random access, corresponding sequence repetition counts (occupied transmission time intervals) are $\{R_1, \ldots, R_N\}$, and power offsets corresponding to the first preamble sequence resource pool for coverage enhancement random access to the $N^{th}$ preamble sequence resource pool for coverage enhancement random access are $\{X_1, \ldots, X_N\}$. A definition of a power offset is a coverage enhancement amount corresponding to the resource, or may be any power offset defined by the system.

If the initial target receive power of the preamble sequence defined by the system is preambleInitialReceivedTargetPower, the power ramp step is powerRampingStep, and generally, when the first random access is initiated and preamble_transmission_counter=1, step 201 may further be specifically as follows:

during transmit power calculation, superposing power offsets in ascending order or descending order of repetition counts R or power offsets X; and stopping until $X_i$ that meets the following formula is found according to calculation of the following formulas, or if the following inequality cannot be met after all $R_i$ or $X_i$ are traversed, performing transmission according to the maximum transmit power Pmax, where:

PREAMBLE_RECEIVED_TARGET_
POWER$_i^1$=preambleInitialReceivedTargetPower+
DELTA_PREAMBLE−$X_i$+(preamble_transmission_counter−1)*powerRampingStep; and PREAMBLE_RECEIVED_TARGET_POWER$_i^1$+PL−Pmax≤Δ, where Δ≥0, and Δ is a constant and a preset threshold.

If the user equipment uses the preamble sequence resource pool i for coverage enhancement random access, during initial access of the user equipment, a transmit power at each transmission time interval is:

Power=min{Pmax,PREAMBLE_RECEIVED_TARGET_POWER$_i^1$+PL} [dBm].

However, it is not ensured that successful access can be implemented when the first random access is initiated, and successful access may be implemented only after power ramping is performed. In an original resource pool, a target power requirement that is imposed after power ramping is performed may be met; and the resource pool does not need to be changed. Alternatively, in an original resource pool, a target power requirement that is imposed after power ramping is performed cannot be met; and the resource pool need to be changed to a resource pool corresponding to a larger repetition count/a larger coverage enhancement amount. Therefore, the following uses an example of multiple times of random access so as to ensure that a process thereof can be clearly described.

It is assumed that there are N preamble sequence resource pools for coverage enhancement random access in the system, where N is a positive integer. From the first preamble sequence resource pool for coverage enhancement random access to the $N^{th}$ preamble sequence resource pool for coverage enhancement random access, corresponding sequence repetition counts are $\{R_1, \ldots, R_N\}$, and power offsets corresponding to the first preamble sequence resource pool for coverage enhancement random access to the $N^{th}$ preamble sequence resource pool for coverage enhancement random access are $\{X_1, \ldots, X_N\}$. A definition of a power offset is a coverage enhancement amount corresponding to the resource, or may be any power offset defined by the system due to coverage enhancement.

If the initial target receive power of the preamble sequence defined by the system is preambleInitialReceivedTargetPower, and the power ramp step is powerRampingStep, when preamble_transmission_counter=1, a procedure is as follows:

During transmit power calculation, the user equipment superposes power offsets in ascending order of repetition counts $R\{R_1, \ldots, R_N\}$ or power offsets $X\{X_1, \ldots, X_N\}$; and may stop until $X_i$ that meets the following formula is found according to calculation of the following formulas, or if the following inequality cannot be met after all $R_i$ or $X_i$ are traversed, perform transmission according to the maximum transmit power Pmax, where an initial value of preamble_transmission_counter is 1; and the following is calculated in ascending order of $X_i$:

PREAMBLE_RECEIVED_TARGET_POWER$_i^1$=preambleInitialReceivedTargetPower+DELTA_PREAMBLE-$X_i$+(preamble_transmission_counter−1)*powerRampingStep; and PREAMBLE_RECEIVED_TARGET_POWER$_i^1$+PL−Pmax≤Δ, where Δ≥0, and Δ is a constant and a preset threshold.

When the foregoing inequality is met, calculation is stopped, the preamble sequence resource pool i for coverage enhancement random access is selected, and the transmit power of the preamble sequence is set to PREAMBLE_RECEIVED_TARGET_POWER$_i^1$+PL [dBm]; or the inequality is not met after all $X_i$ are traversed, and the transmit power of the preamble sequence is set to Pmax.

Step 202: Send the preamble sequence according to the determined transmit power.

Further, if the user equipment has not received a response from the base station side within a set time window after sending the preamble sequence, it is considered that current transmission fails. preamble_transmission_counter=preamble_transmission_counter+1, where preamble_transmission_counter ∈{1, 2, . . . , preambleTransMax}. Power ramping (power ramping) is performed according to the power ramp step powerRampingStep broadcast by the system. According to the formulas, first, it is assumed that the preamble sequence resource pool for coverage enhancement random access is not changed, that is, $X_i$ is not changed, and the calculation is performed again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter−1)*powerRampingStep; and PREAMBLE_RECEIVED_TARGET_POWER$_i^{preamble\_transmission\_counter}$+PL−Pmax≤Δ, where Δ≥0, and Δ is a constant and a preset threshold.

If the inequality is still met, the preamble sequence resource pool i for coverage enhancement random access continues to be selected. A target receive power that is of the preamble sequence and is corresponding to preamble_transmission_counter (that is already increased by 1 for itself) in this case is PREAMBLE_RECEIVED_TARGET_POWER$_i^{Preamble\_transmission\_counter}$. The transmit power of the preamble sequence is set to PREAMBLE_RECEIVED_TARGET_POWER$_i^{preamble\_transmission\_counter}$+PL [dBm].

If the inequality cannot be met, i=i+1, the preamble sequence resource pool for coverage enhancement random access is changed in ascending order of $X_i$, and the calculation is performed again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter−1)*powerRampingStep; and PREAMBLE_RECEIVED_TARGET_POWER$_i^{preamble\_transmission\_counter}$+PL−Pmax≤Δ, where Δ≥0, and Δ is a constant and a preset threshold.

Until the inequality is met, a preamble sequence resource pool for coverage enhancement random access corresponding to $X_i$ in this case is selected. A target receive power that is of the preamble sequence and is corresponding to preamble_transmission_counter in this case is PREAMBLE_RECEIVED_TARGET_POWER$_i^{preamble\_transmission\_counter}$. The transmit power of the preamble sequence is set to (PREAMBLE_RECEIVED_TARGET_POWER$_i^{preamble\_transmission\_counter}$) [dBm].

Alternatively, the inequality is not met after all $X_i$ are traversed, and the transmit power of the preamble sequence is set to Pmax.

In brief, step 201 may also include:

obtaining the transmit power according to the power offset $X_i$, and sending the preamble sequence according to the transmit power, to perform the preamble_transmission_counter$^{th}$ random access;

if the preamble_transmission_counter$^{th}$ random access fails, making preamble_transmission_counter=preamble_transmission_counter+1, keeping $X_i$ unchanged, and calculating the following again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter−1)*powerRampingStep; and if a condition that PREAMBLE_RECEIVED_TARGET_POWER$_i^{preamble\_transmission\_counter}$+PL−Pmax≤Δ is met, performing transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if a condition that PREAMBLE_RECEIVED_TARGET_POWER$_i^{preamble\_transmission\_counter}$+PL−Pmax≤Δ is not met, searching for the power offset $X_i$ in ascending order of repetition counts, that is, occupied transmission time intervals, or the power offsets $X_i$, and determining whether the found power offset $X_i$ meets that PREAMBLE_RECEIVED_TARGET_POWER$_i^{preamble\_transmission\_counter}$+PL−Pmax≤Δ; and if a minimum value of $X_i$ that meets the foregoing formula is found, performing transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if the foregoing inequality cannot be met after all $X_i$ are traversed, performing transmission by using a repetition count corresponding to a preamble sequence resource pool i for coverage enhancement random access that is found at last, where the transmit power is Pmax, and $\Delta \geq 0$, and $\Delta$ is a constant and a preset threshold.

In this implementation manner of the present invention, when user equipment performs transmission by using a preamble sequence resource pool for coverage enhancement random access, during transmit power calculation, a power offset is introduced, that is, a power gain brought by means of repeated transmission performed by using the preamble sequence resource pool for coverage enhancement random access is introduced, and the gain is converted for the transmit power calculation. Because the repeated transmission itself brings a coverage enhancement amount (dB) X, when a target receive power of a preamble sequence is calculated, the gain is deducted, and PREAMBLE_RECEIVED_TARGET_POWER=preambleInitialReceivedTargetPower+DELTA_PREAMBLE−$X_i$+(preamble_transmission_counter−1)*powerRampingStep.

That is, the target receive power of the preamble sequence may be correspondingly decreased by X dB. After such calculation is performed, according to the prior art, PREAMBLE_RECEIVED_TARGET_POWER+PL is also correspondingly decreased by X dB, and a transmit power Power=min{Pmax,PREAMBLE_RECEIVED_TARGET_POWER+PL} [dbm] is calculated. For user equipments whose coverage enhancement requirements are less than or equal to X dB, that is, all users who meet PREAMBLE_RECEIVED_TARGET_POWER+PL−Pmax≤X, because PREAMBLE_RECEIVED_TARGET_POWER+PL has been correspondingly decreased by X dB, in this case, PREAMBLE_RECEIVED_TARGET_POWER+PL is less than Pmax, that is, according to calculation of the formulas, a transmit power is PREAMBLE_RECEIVED_TARGET_POWER+PL. In this way, it may be ensured that receive powers received on a base station side are close to each other and are PREAMBLE_RECEIVED_TARGET_POWER, thereby overcoming a near-far effect. Likewise, all user equipments whose coverage enhancement requirements are less than or equal to X dB perform transmission according to the transmit power: PREAMBLE_RECEIVED_TARGET_POWER+PL, so that a path loss is overcome, a same target receive power is achieved, and no power is wasted.

Figure 3:
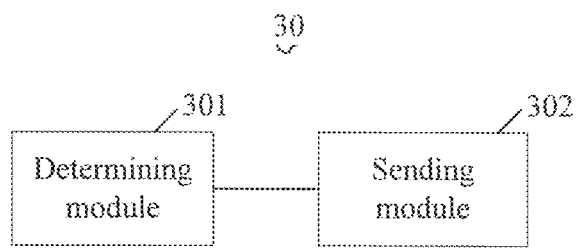
FIG. 3 is a schematic structural diagram of a first implementation manner of user equipment according to the present invention.

Referring to FIG. 3, FIG. 3 is a schematic structural diagram of a first implementation manner of user equipment according to the present invention. As shown in FIG. 3, user equipment 30 includes a determining module 301 and a sending module 302.

The determining module 301 is configured to determine a transmit power for sending a preamble sequence, where the transmit power meets the following formula:

Power=min{$P$max,PREAMBLE_RECEIVED_TARGET_POWER$_i^{preamble\_transmission\_counter}$+PL}

Power is the determined transmit power, Pmax is a maximum transmit power of the user equipment, PL is a path loss value obtained by estimating according to a downlink path loss, and PREAMBLE_RECEIVED_TARGET_POWER$_i^{preamble\_transmission\_counter}$ is a target receive power of the preamble sequence, where PREAMBLE_RECEIVED_TARGET_POWER$_i^{preamble\_transmission\_counter}$=preambleInitialReceivedTargetPower+DELTA_PREAMBLE−$X_i$+(preamble_transmission_counter−1)*powerRampingStep.

preambleInitialReceivedTargetPower is an initial target receive power of the preamble sequence, where the initial target receive power of the preamble sequence may be notified by a target base station by using system information, and the initial target receive power preambleInitialReceivedTargetPower of the preamble sequence may be set to −120 dBm, −118 dBm, −116 dBm, or the like. DELTA_PREAMBLE is a power offset based on a format of the preamble sequence, and values are shown in the following table:

| Values of DELTA_PREAMBLE | |
| --- | --- |
| Format of a preamble sequence | Value of DELTA_PREAMBLE |
| 0 | 0 dB |
| 1 | 0 dB |
| 2 | −3 dB |
| 3 | −3 dB |
| 4 | 8 dB |

$X_i$ is a power offset corresponding to a preamble sequence resource pool i for coverage enhancement random access. preamble_transmission_counter is a repetition count for transmitting the preamble sequence, where preamble_transmission_counter ∈ {1, 2, . . . , preambleTransMax} and is set to 1 during initial access, and preambleTransMax is a system parameter and is a maximum transmission count of the preamble sequence. powerRampingStep is a power ramp step, where the power ramp step may be notified by the target base station by using the system information, and the power ramp step powerRampingStep that is of the preamble sequence and is broadcast by the target base station may be set to 0 dB, 2 dB, 4 dB, 6 dB, or the like.

It can be learned from the foregoing MIN formula that, when PREAMBLE_RECEIVED_TARGET_POWER$_i^{preamble\_transmission\_counter}$+PL is less than Pmax, a transmit power value of the preamble sequence of the user equipment is set to PREAMBLE_RECEIVED_TARGET_POWER$_i^{preamble\_transmission\_counter}$+PL; otherwise, a transmit power value of the preamble sequence of the user equipment is set to Pmax.

For $X_i$, it should further be noted that, information that is used for a preamble sequence resource pool for coverage enhancement random access and is set by the base station includes a corresponding repetition count (that is, occupied transmission time intervals) and/or information about a corresponding coverage enhancement amount (dB), and may be obtained by notifying the system information of the base station, or may be obtained in a predefined manner. The information about the preamble sequence resource pool for coverage enhancement random access includes the corresponding repetition count R, that is, a quantity of the occupied transmission time intervals, and/or the information X about the corresponding coverage enhancement amount (dB), and there is a correspondence between the repetition count, that is, the quantity of the occupied transmission time intervals, corresponding to the preamble sequence resource pool for coverage enhancement random access, and the corresponding coverage enhancement amount (dB). Therefore, the information can still be finally obtained even if the information about the coverage enhancement amount (dB) does not exist.

The power offset $X_i$ is a coverage enhancement amount corresponding to the preamble sequence resource pool i for coverage enhancement random access, or the power offset $X_i$ is a coverage enhancement amount that is corresponding to the repetition count, that is, occupied transmission time intervals, corresponding to the preamble sequence resource pool i for coverage enhancement random access. Further, the power offset $X_i$ is obtained from the information about the preamble sequence resource pool for coverage enhancement random access, where the information about the preamble sequence resource pool for coverage enhancement random access is obtained by notifying the system information, or is obtained in a manner predefined by a current device.

In an implementation of the present invention, the target receive power preambleInitialReceivedTargetPower, in the system information, of the preamble sequence resource pool for coverage enhancement random access may be defined, so that the target receive power includes the coverage enhancement amount (dB) X. For example, for common user equipment, an initial target receive power of a preamble sequence resource pool for random access is preambleInitialReceivedTargetPower, and a target receive power of a preamble sequence resource pool for coverage enhancement random access is preambleInitialReceivedTargetPower−X, where X is a power offset; then:

PREAMBLE_RECEIVED_TARGET_
POWER=preambleInitialReceivedTargetPower+
DELTA_PREAMBLE+(preamble_transmission_counter−1)*powerRampingStep.

In another implementation of the present invention, if the initial target receive power that is of the preamble sequence and is broadcast by a system is preambleInitialReceivedTargetPower, the target receive power of the preamble sequence resource pool for coverage enhancement random access is as follows:

PREAMBLE_RECEIVED_TARGET_
POWER=preambleInitialReceivedTargetPower+
DELTA_PREAMBLE−X+(preamble_transmission_counter−1)*powerRampingStep.

In this case, the power offset X is a coverage enhancement amount. The user equipment needs to use the preamble sequence resource pool for coverage enhancement random access; and a transmit power of the user equipment at each transmission time interval is:

Power=min{Pmax,PREAMBLE_RECEIVED_TARGET_POWER+PL} [dBm], where min{ } is a MIN function, and Pmax is the maximum transmit power of the user equipment.

PREAMBLE_RECEIVED_TARGET_POWER is the target receive power of the preamble sequence resource pool.

X is the power offset corresponding to the preamble sequence resource pool, that is, the coverage enhancement amount (dB).

PL is a path loss value obtained by estimating according to the downlink path loss. More generally, the base station may set N preamble sequence resource pools for coverage enhancement random access, where N is a positive integer. Each preamble sequence resource pool for coverage enhancement random access includes a corresponding repetition count, that is, occupied transmission time intervals, and/or information about a corresponding coverage enhancement amount (dB) that is represented by $X_i$, where $i \in \{1, \ldots, N\}$, that is, there are at least two power offsets $X_i$. For ease of description, the preamble sequence resource pool for coverage enhancement random access is referred to as a preamble sequence resource pool for short in the following.

If the initial target receive power of the preamble sequence of a system is preambleInitialReceivedTargetPower a target receive power of the $i^{th}$ preamble sequence resource pool for coverage enhancement random access is as follows:

PREAMBLE_RECEIVED_TARGET_
POWER=preambleInitialReceivedTargetPower+
DELTA_PREAMBLE−$X_i$+(preamble_transmission_counter−1)*powerRampingStep.

It is assumed that there are N preamble sequence resource pools for coverage enhancement random access in the system, where N is a positive integer. From the first preamble sequence resource pool for coverage enhancement random access to the $N^{th}$ preamble sequence resource pool for coverage enhancement random access, corresponding sequence repetition counts are $\{R_1, \ldots, R_N\}$, and power offsets corresponding to the first preamble sequence resource pool for coverage enhancement random access to the $N^{th}$ preamble sequence resource pool for coverage enhancement random access are $\{X_1, \ldots, X_N\}$. A definition of a power offset is a coverage enhancement amount corresponding to the resource, or may be any power offset defined by the system.

If the initial target receive power of the preamble sequence defined by the system is preambleInitialReceivedTargetPower, the power ramp step is powerRampingStep, and generally, when the first random access is initiated and preamble_transmission_counter=1, the determining module 301 may further be specifically as follows:

during transmit power calculation, superposing power offsets in ascending order or descending order of repetition counts R or power offsets X; and stopping until $X_i$ that meets the following formula is found according to calculation of the following formulas, or if the following inequality cannot be met after all $R_i$ or $X_i$ are traversed, performing transmission according to the maximum transmit power Pmax, where:

PREAMBLE_RECEIVED_TARGET_
$POWER_i^1$=preambleInitialReceivedTarget
Power+DELTA_PREAMBLE−$X_i$+(preamble_transmission_counter−1)*powerRampingStep;
and PREAMBLE_RECEIVED_TARGET_$POWER_i^1$+PL−Pmax≤Δ, where Δ≥0, and Δ is a constant and a preset threshold.

If the user equipment uses the preamble sequence resource pool i for coverage enhancement random access, during initial access of the user equipment, a transmit power at each transmission time interval is:

Power=min{Pmax,PREAMBLE_RECEIVED_TARGET_$POWER_i^1$+PL} [dBm].

However, it is not ensured that successful access can be implemented when the first random access is initiated, and successful access may be implemented only after power ramping is performed. In an original resource pool, a target power requirement that is imposed after power ramping is performed may be met; and the resource pool does not need to be changed. Alternatively, in an original resource pool, a target power requirement that is imposed after power ramping is performed cannot be met; and the resource pool needs to be changed to a resource pool corresponding to a larger repetition count/a larger coverage enhancement amount.

Therefore, the following uses an example of multiple times of random access so as to ensure that a process thereof can be clearly described.

It is assumed that there are N preamble sequence resource pools for coverage enhancement random access in the system, where N is a positive integer. From the first preamble sequence resource pool for coverage enhancement random access to the $N^{th}$ preamble sequence resource pool for coverage enhancement random access, corresponding sequence repetition counts are $\{R_1, \ldots, R_N\}$, and power offsets corresponding to the first preamble sequence resource pool for coverage enhancement random access to the $N^{th}$ preamble sequence resource pool for coverage enhancement random access are $\{X_1, \ldots, X_N\}$. A definition of a power offset is a coverage enhancement amount corresponding to the resource, or may be any power offset defined by the system due to coverage enhancement.

If the initial target receive power of the preamble sequence defined by the system is preambleInitialReceivedTargetPower, and the power ramp step is powerRampingStep, when preamble_transmission_counter=1, a procedure is as follows:

During transmit power calculation, the user equipment superposes power offsets in ascending order of repetition counts $R\{R_1, \ldots, R_N\}$ or power offsets $X\{X_1, \ldots, X_N\}$; and may stop until $X_i$ that meets the following formula is found according to calculation of the following formulas, or if the following inequality cannot be met after all $R_i$ or $X_i$ are traversed, perform transmission according to the maximum transmit power Pmax, where an initial value of preamble_transmission_counter is 1; and the following is calculated in ascending order of $X_i$:

PREAMBLE_RECEIVED_TARGET_POWER$_i^1$=preambleInitialReceivedTargetPower+DELTA_PREAMBLE-$X_i$+(preamble_transmission_counter-1)*powerRampingStep; and PREAMBLE_RECEIVED_TARGET_POWER$_i^1$+PL-Pmax≤Δ, where Δ≥0, and Δ is a constant and a preset threshold.

When the foregoing inequality is met, calculation is stopped, the preamble sequence resource pool i for coverage enhancement random access is selected, and the transmit power of the preamble sequence is set to PREAMBLE_RECEIVED_TARGET_POWER$_i^1$+PL [dBm]; or the inequality is not met after all $X_i$ are traversed, and the transmit power of the preamble sequence is set to Pmax.

The sending module 302 is configured to send the preamble sequence according to the determined transmit power.

Further, if the user equipment 30 has not received a response from the base station side within a set time window after sending the preamble sequence, it is considered that current transmission fails. preamble_transmission_counter=preamble_transmission_counter+1, where preamble_transmission_counter ∈{1, 2, ..., preambleTransMax}. Power ramping (power ramping) is performed according to the power ramp step powerRampingStep broadcast by the system. According to the formulas, first, it is assumed that the preamble sequence resource pool for coverage enhancement random access is not changed, that is, $X_i$ is not changed, and the calculation is performed again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep; and PREAMBLE_RECEIVED_TARGET_POWER$_i^{preamble\_transmission\_counter}$+PL-Pmax≤Δ, where Δ≥0, and Δ is a constant and a preset threshold.

If the inequality is still met, the preamble sequence resource pool i for coverage enhancement random access continues to be selected. The target receive power that is of the preamble sequence and is corresponding to preamble_transmission_counter (that is already increased by 1 for itself) in this case is PREAMBLE_RECEIVED_TARGET_POWER$_i^{preamble\_transmission\_counter}$. The transmit power of the preamble sequence is set to PREAMBLE_RECEIVED_TARGET_POWER$_i^{preamble\_transmission\_counter}$+PL [dBm].

If the inequality cannot be met, i=i+1, the preamble sequence resource pool for coverage enhancement random access is changed in ascending order of $X_i$, and the calculation is performed again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep; and PREAMBLE_RECEIVED_TARGET_POWER$_i^{preamble\_transmission\_counter}$+PL-Pmax≤Δ, where Δ≥0, and Δ is a constant and a preset threshold.

Until the inequality is met, a preamble sequence resource pool for coverage enhancement random access corresponding to $X_i$ in this case is selected. The target receive power that is of the preamble sequence and is corresponding to preamble_transmission_counter (that is already increased by 1 for itself) in this case is PREAMBLE_RECEIVED_TARGET_POWER$_i^{preamble\_transmission\_counter}$. The transmit power of the preamble sequence is set to (PREAMBLE_RECEIVED_TARGET_POWER$_i^{preamble\_transmission\_counter}$) [dBm].

Alternatively, the inequality is not met after all $X_i$ are traversed, and the transmit power of the preamble sequence is set to Pmax.

In brief, the determining module 301 may also be specifically configured to: obtain the transmit power according to the power offset $X_i$, and send the preamble sequence according to the transmit power, to perform the preamble_transmission_counter$^{th}$ random access;

if the preamble_transmission_counter$^{th}$ random access fails, make preamble_transmission_counter=preamble_transmission_counter+1, keep $X_i$ unchanged, and calculate the following again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep; and if a condition that PREAMBLE_RECEIVED_TARGET_POWER$_i^{preamble\_transmission\_counter}$+PL-Pmax≤Δ is met, perform transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if a condition that PREAMBLE_RECEIVED_TARGET_POWER$_i^{preamble\_transmission\_counter}$+PL-Pmax≤Δ is not met, search for the power offset $X_i$ in ascending order of repetition counts, that is, occupied transmission time intervals, or the power offsets $X_i$, and determine whether the found power offset $X_i$ meets that PREAMBLE_RECEIVED_TARGET_POWER$_i^{preamble\_transmission\_counter}$+PL-Pmax≤Δ; and if a minimum value of $X_i$ that meets the foregoing formula is found, performing transmission by using the repetition count corresponding to the preamble sequence resource pool i for coverage enhancement random access, where the transmit power is $\text{PREAMBLE\_RECEIVED\_TARGET\_POWER}_i^{preamble\_transmission\_counter}+\text{PL}$; or if the foregoing inequality cannot be met after all $X_i$ are traversed, performing transmission by using a repetition count corresponding to a preamble sequence resource pool i for coverage enhancement random access that is found at last, where the transmit power is Pmax, and $\Delta \geq 0$, and $\Delta$ is a constant and a preset threshold.

In this implementation manner of the present invention, when the user equipment performs transmission by using a preamble sequence resource pool for coverage enhancement random access, during transmit power calculation, a power offset is introduced, that is, a power gain brought by means of repeated transmission performed by using the preamble sequence resource pool for coverage enhancement random access is introduced, and the gain is converted for the transmit power calculation. Because the repeated transmission itself brings a coverage enhancement amount (dB) X, when a target receive power of a preamble sequence is calculated, the gain is deducted, and $\text{PREAMBLE\_RECEIVED\_TARGET\_POWER}=\text{preambleInitialReceivedTargetPower}+\text{DELTA\_PREAMBLE}-X_i+(\text{preamble\_transmission\_counter}-1)*\text{powerRampingStep}$.

That is, the target receive power of the preamble sequence may be correspondingly decreased by X dB. After such calculation is performed, according to the prior art, PREAMBLE_RECEIVED_TARGET_POWER+PL is also correspondingly decreased by X dB; and a transmit power Power=min{Pmax,PREAMBLE_RECEIVED_TARGET_POWER+PL} [dbm] is calculated. For user equipments whose coverage enhancement requirements are less than or equal to X dB, that is, all users who meet PREAMBLE_RECEIVED_TARGET_POWER+PL−Pmax≤X, because PREAMBLE_RECEIVED_TARGET_POWER+PL has been correspondingly decreased by X dB, in this case, PREAMBLE_RECEIVED_TARGET_POWER+PL is less than Pmax, that is, according to calculation of the formulas, a transmit power is PREAMBLE_RECEIVED_TARGET_POWER+PL. In this way, it may be ensured that receive powers received on a base station side are close to each other and are PREAMBLE_RECEIVED_TARGET_POWER, thereby overcoming a near-far effect. Likewise, all user equipments whose coverage enhancement requirements are less than or equal to X dB perform transmission according to the transmit power: PREAMBLE_RECEIVED_TARGET_POWER+PL, so that a path loss is overcome, a same target receive power is achieved, and no power is wasted.

Figure 4:
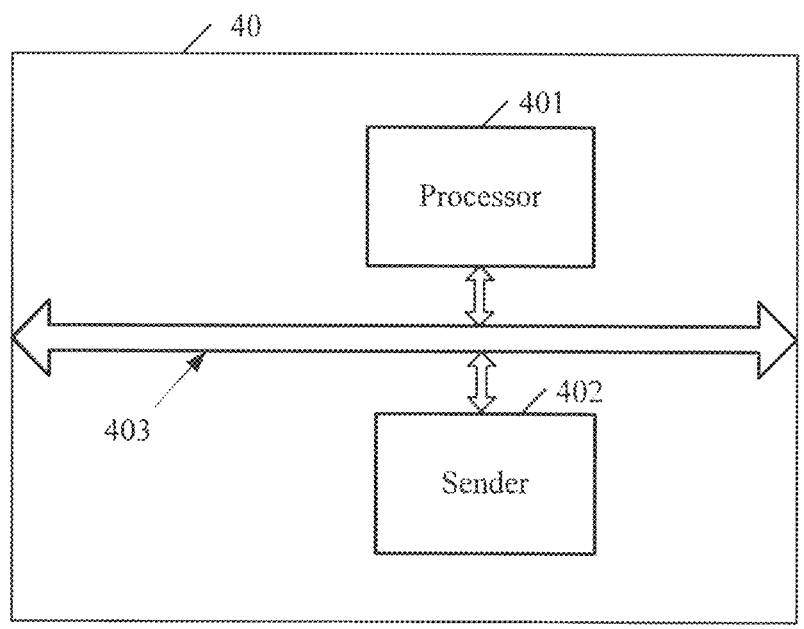
FIG. 4 is a schematic structural diagram of a second implementation manner of user equipment according to the present invention.

Referring to FIG. 4, FIG. 4 is a schematic structural diagram of a second implementation manner of user equipment according to the present invention. As shown in FIG. 4, user equipment 40 includes a processor 401 and a sender 402.

The processor 401 is configured to execute the following operation by using an operation instruction:

determining a transmit power for sending a preamble sequence, where the transmit power meets the following formula: $\text{Power}=\min\{\text{Pmax},\text{PREAMBLE\_RECEIVED\_TARGET\_POWER}_i^{preamble\_transmission\_counter}+\text{PL}\}$ Power is the determined transmit power, Pmax is a maximum transmit power of the user equipment, PL is a path loss value obtained by estimating according to a downlink path loss, and $\text{PREAMBLE\_RECEIVED\_TARGET\_POWER}_i^{preamble\_transmission\_counter}$ is a target receive power of the preamble sequence, where $\text{PREAMBLE\_RECEIVED\_TARGET\_POWER}_i^{preamble\_transmission\_counter}=\text{preambleInitialReceivedTargetPower}+\text{DELTA\_PREAMBLE}-X_i+(\text{preamble\_transmission\_counter}-1)*\text{powerRampingStep}$.

preambleInitialReceivedTargetPower is an initial target receive power of the preamble sequence, where the initial target receive power of the preamble sequence may be notified by a target base station by using system information, and the initial target receive power preambleInitialReceivedTargetPower of the preamble sequence may be set to −120 dBm, −118 dBm, −116 dBm, or the like. DELTA_PREAMBLE is a power offset based on a format of the preamble sequence, and values are shown in the following table:

| Values of DELTA_PREAMBLE | |
|---|---|
| Format of a preamble sequence | Value of DELTA_PREAMBLE |
| 0 | 0 dB |
| 1 | 0 dB |
| 2 | −3 dB |
| 3 | −3 dB |
| 4 | 8 dB |

$X_i$ is a power offset corresponding to a preamble sequence resource pool i for coverage enhancement random access. preamble_transmission_counter is a repetition count for transmitting the preamble sequence, where preamble_transmission_counter $\in \{1, 2, \ldots, \text{preambleTransMax}\}$ and is set to 1 during initial access, and preambleTransMax is a system parameter and is a maximum transmission count of the preamble sequence. powerRampingStep is a power ramp step, where the power ramp step may be notified by the target base station by using the system information, and the power ramp step powerRampingStep that is of the preamble sequence and is broadcast by the target base station may be set to 0 dB, 2 dB, 4 dB, 6 dB, or the like.

It can be learned from the foregoing MIN formula that, when $\text{PREAMBLE\_RECEIVED\_TARGET\_POWER}_i^{preamble\_transmission\_counter}+\text{PL}$ is less than Pmax, a transmit power value of the preamble sequence of the user equipment is set to $\text{PREAMBLE\_RECEIVED\_TARGET\_POWER}_i^{preamble\_transmission\_counter}+\text{PL}$; otherwise, a transmit power value of the preamble sequence of the user equipment is set to Pmax.

For $X_i$, should further be noted that, information that is used for a preamble sequence resource pool for coverage enhancement random access and is set by the base station includes a corresponding repetition count (that is, occupied transmission time intervals) and/or information about a corresponding coverage enhancement amount (dB), and may be obtained by notifying the system information of the base station, or may be obtained in a predefined manner. The information about the preamble sequence resource pool for coverage enhancement random access includes the corresponding repetition count R, that is, a quantity of the occupied transmission time intervals, and/or the information X about the corresponding coverage enhancement amount (dB), and there is a correspondence between the repetition count, that is, the quantity of the occupied transmission time intervals, corresponding to the preamble sequence resource pool for coverage enhancement random access, and the corresponding coverage enhancement amount (dB). Therefore, the information can still be finally obtained even if the information about the coverage enhancement amount (dB) does not exist.

The power offset $X_i$ is a coverage enhancement amount corresponding to the preamble sequence resource pool i for coverage enhancement random access, or the power offset $X_i$ is a coverage enhancement amount that is corresponding to the repetition count, that is, occupied transmission time intervals, corresponding to the preamble sequence resource pool i for coverage enhancement random access. Further, the power offset $X_i$ is obtained from the information about the preamble sequence resource pool for coverage enhancement random access, where the information about the preamble sequence resource pool for coverage enhancement random access is obtained by notifying the system information, or is obtained in a manner predefined by a current device.

In another implementation of the present invention, if the initial target receive power that is of the preamble sequence and is broadcast by a system is preambleInitialReceivedTargetPower, the target receive power of the preamble sequence resource pool for coverage enhancement random access is as follows:

PREAMBLE_RECEIVED_TARGET_POWER=preambleInitialReceivedTargetPower+DELTA_PREAMBLE-$X$+(preamble_transmission_counter-1)*powerRampingStep.

In this case, the power offset X is a coverage enhancement amount. The user equipment needs to use the preamble sequence resource pool for coverage enhancement random access; and a transmit power of the user equipment at each transmission time interval is:

Power=min{$P$max,PREAMBLE_RECEIVED_TARGET_POWER+PL} [dBm], where min{ } is a MIN function, and Pmax is the maximum transmit power of the user equipment.

PREAMBLE_RECEIVED_TARGET_POWER is the target receive power of the preamble sequence resource pool.

X is the power offset corresponding to the preamble sequence resource pool, that is, the coverage enhancement amount (dB).

PL is a path loss value obtained by estimating according to the downlink path loss. More generally, the base station may set N preamble sequence resource pools for coverage enhancement random access, where N is a positive integer. Each preamble sequence resource pool for coverage enhancement random access includes a corresponding repetition count, that is, occupied transmission time intervals, and/or information about a corresponding coverage enhancement amount (dB) that is represented by $X_i$, where $i \in \{1, \ldots, N\}$, that is, there are at least two power offsets $X_i$. For ease of description, the preamble sequence resource pool for coverage enhancement random access is referred to as a preamble sequence resource pool for short in the following.

If the initial target receive power of the preamble sequence of a system is preambleInitialReceivedTargetPower, a target receive power of the $i^{th}$ preamble sequence resource pool for coverage enhancement random access is as follows:

PREAMBLE_RECEIVED_TARGET_POWER=preambleInitialReceivedTargetPower+DELTA_PREAMBLE-$X_i$+(preamble_transmission_counter-1)*powerRampingStep.

It is assumed that there are N preamble sequence resource pools for coverage enhancement random access in the system, where N is a positive integer. From the first preamble sequence resource pool for coverage enhancement random access to the $N^{th}$ preamble sequence resource pool for coverage enhancement random access, corresponding sequence repetition counts (occupied transmission time intervals) are $\{R_1, \ldots, R_N\}$, and power offsets corresponding to the first preamble sequence resource pool for coverage enhancement random access to the $N^{th}$ preamble sequence resource pool for coverage enhancement random access are $\{X_1, \ldots, X_N\}$. A definition of a power offset is a coverage enhancement amount corresponding to the resource, or may be any power offset defined by the system.

If the initial target receive power of the preamble sequence defined by the system is preambleInitialReceivedTargetPower, the power ramp step is powerRampingStep, and generally, when the first random access is initiated and preamble_transmission_counter=1, step 201 may further be specifically as follows:

during transmit power calculation, superposing power offsets in ascending order or descending order of repetition counts R or power offsets X; and stopping until $X_i$ that meets the following formula is found according to calculation of the following formulas, or if the following inequality cannot be met after all $R_i$ or $X_i$ are traversed, performing transmission according to the maximum transmit power Pmax, where:

PREAMBLE_RECEIVED_TARGET_POWER$_i^1$=preambleInitialReceivedTargetPower+DELTA_PREAMBLE-$X_i$+(preamble_transmission_counter-1)*powerRampingStep; and PREAMBLE_RECEIVED_TARGET_POWER$_i^1$+PL-Pmax≤Δ, where Δ≥0.

If the user equipment uses the preamble sequence resource pool i for coverage enhancement random access, during initial access of the user equipment, a transmit power at each transmission time interval is:

Power=min{$P$max,PREAMBLE_RECEIVED_TARGET_POWER$_i^1$+PL} [dBm].

However, it is not ensured that successful access can be implemented when the first random access is initiated, and successful access may be implemented only after power ramping is performed. In an original resource pool, a target power requirement that is imposed after power ramping is performed may be met; and the resource pool does not need to be changed. Alternatively, in an original resource pool, a target power requirement that is imposed after power ramping is performed cannot be met; and the resource pool needs to be changed to a resource pool corresponding to a larger repetition count/a larger coverage enhancement amount. Therefore, the following uses an example of multiple times of random access so as to ensure that a process thereof can be clearly described.

It is assumed that there are N preamble sequence resource pools for coverage enhancement random access in the system, where N is a positive integer. From the first preamble sequence resource pool for coverage enhancement random access to the $N^{th}$ preamble sequence resource pool for coverage enhancement random access, corresponding sequence repetition counts are $\{R_1, \ldots, R_N\}$, and power offsets corresponding to the first preamble sequence resource pool for coverage enhancement random access to the $N^{th}$ preamble sequence resource pool for coverage enhancement random access are $\{X_1, \ldots, X_N\}$. A definition of a power offset is a coverage enhancement amount corresponding to the resource, or may be any power offset defined by the system due to coverage enhancement.

If the initial target receive power of the preamble sequence defined by the system is preambleInitialReceived- TargetPower, and the power ramp step is powerRampingStep, when preamble_transmission_counter=1, a procedure is as follows:

During transmit power calculation, the user equipment superposes power offsets in ascending order of repetition counts R$\{R_1, \ldots, R_N\}$ or power offsets X$\{X_1, \ldots, X_N\}$; and may stop until $X_i$ that meets the following formula is found according to calculation of the following formulas, or if the following inequality cannot be met after all $R_i$ or $X_i$ are traversed, perform transmission according to the maximum transmit power Pmax, where an initial value of preamble_transmission_counter is 1; and the following is calculated in ascending order of $X_i$:

PREAMBLE_RECEIVED_TARGET_POWER$_i^1$=preambleInitialReceivedTargetPower+DELTA_PREAMBLE-$X_i$+(preamble_transmission_counter-1)*powerRampingStep; and PREAMBLE_RECEIVED_TARGET_POWER$_i^1$+PL-Pmax≤Δ, where Δ≥0.

When the foregoing inequality is met, calculation is stopped, the preamble sequence resource pool i for coverage enhancement random access is selected, and the transmit power of the preamble sequence is set to PREAMBLE_RECEIVED_TARGET_POWER$_i^1$+PL [dBm]; or the inequality is not met after all $X_i$ are traversed, and the transmit power of the preamble sequence is set to Pmax.

The sender 402 is configured to send the preamble sequence according to the determined transmit power.

Further, if the user equipment has not received a response from the base station side within a set time window after sending the preamble sequence, it is considered that current transmission fails. preamble_transmission_counter=preamble_transmission_counter+1, where preamble_transmission_counter ∈{1, 2, . . . , preambleTransMax}. Power ramping (power ramping) is performed according to the power ramp step powerRampingStep broadcast by the system. According to the formulas, first, it is assumed that the preamble sequence resource pool for coverage enhancement random access is not changed, that is, $X_i$ is not changed, and the calculation is performed again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep; and PREAMBLE_RECEIVED_TARGET_POWER$_i^{preamble\_transmission\_counter}$+PL-Pmax≤Δ, where Δ≥0, and Δ is a constant and a preset threshold.

If the inequality is still met, the preamble sequence resource pool i for coverage enhancement random access continues to be selected. A target receive power that is of the preamble sequence and is corresponding to preamble_transmission_counter (that is already increased by 1 for itself) in this case is PREAMBLE_RECEIVED_TARGET_POWER$_i^{preamble\_transmission\_counter}$. The transmit power of the preamble sequence is set to PREAMBLE_RECEIVED_TARGET_POWER$_i^{preamble\_transmission\_counter}$+PL [dbm].

If the inequality cannot be met, i=i+1, the preamble sequence resource pool for coverage enhancement random access is changed in ascending order of $X_i$, and the calculation is performed again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep; and PREAMBLE_RECEIVED_TARGET_POWER$_i^{preamble\_transmission\_counter}$+PL-Pmax≤Δ, where Δ≥0, and Δ is a constant and a preset threshold.

Until the inequality is met, a preamble sequence resource pool for coverage enhancement random access corresponding to $X_i$ in this case is selected. A target receive power that is of the preamble sequence and is corresponding to preamble_transmission_counter in this case is PREAMBLE_RECEIVED_TARGET_POWER$_i^{preamble\_transmission\_counter}$. The transmit power of the preamble sequence is set to (PREAMBLE_RECEIVED_TARGET_POWER$_i^{preamble\_transmission\_counter}$) [dBm].

Alternatively, the inequality is not met after all $X_i$ are traversed, and the transmit power of the preamble sequence is set to Pmax.

In brief, the processor 401 may also include:

obtaining the transmit power according to the power offset $X_i$, and sending the preamble sequence according to the transmit power, to perform the preamble_transmission_counter$^{th}$ random access;

if the preamble_transmission_counter$^{th}$ random access fails, making preamble_transmission_counter=preamble_transmission_counter+1, keeping $X_i$ unchanged, and calculating the following again:

PREAMBLE_RECEIVED_TARGET_POWER$_i^{preamble\_transmission\_counter}$=preambleInitialReceivedTargetPower+DELTA_PREAMBLE-$X_i$+(preamble_transmission_counter-1)*powerRampingStep; and if a condition that PREAMBLE_RECEIVED_TARGET_POWER$_i^{preamble\_transmission\_counter}$+PL-Pmax≤Δ is met, performing transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if a condition that PREAMBLE_RECEIVED_TARGET_POWER$_i^{preamble\_transmission\_counter}$+PL-Pmax≤Δ is not met, searching for the power offset $X_i$ in ascending order of repetition counts, that is, occupied transmission time intervals, or the power offsets $X_i$, and determining whether the found power offset $X_i$ meets that PREAMBLE_RECEIVED_TARGET_POWER$_i^{preamble\_transmission\_counter}$+PL-Pmax≤Δ; and if a minimum value of $X_i$ that meets the foregoing formula is found, performing transmission by using the repetition count corresponding to the preamble sequence resource pool i for coverage enhancement random access, where the transmit power is PREAMBLE_RECEIVED_TARGET_POWER$_i^{preamble\_transmission\_counter}$+PL; or if the foregoing inequality cannot be met after all $X_i$ are traversed, performing transmission by using a repetition count corresponding to a preamble sequence resource pool i for coverage enhancement random access that is found at last, where the transmit power is Pmax, and Δ≥0, and Δ is a constant and a preset threshold.

The processor 401 controls an operation of the user equipment 40, and the processor 401 may also be referred to as a CPU (Central Processing Unit, central processing unit). In a specific application, components of the user equipment 40 are coupled together by using a bus system 403, where in addition to a data bus, the bus system 403 may further include a power bus, a control bus, a status signal bus, and the like. However, for clear description, various types of buses in the figure are marked as the bus system 403.

In this implementation manner of the present invention, when the user equipment performs transmission by using a preamble sequence resource pool for coverage enhancement random access, during transmit power calculation, a power offset is introduced, that is, a power gain brought by means of repeated transmission performed by using the preamble sequence resource pool for coverage enhancement random access is introduced, and the gain is converted for the transmit power calculation. Because the repeated transmission itself brings a coverage enhancement amount (dB) X, when a target receive power of a preamble sequence is calculated, the gain is deducted, and PREAMBLE_RECEIVED_TARGET_POWER= preambleInitialReceivedTargetPower+DELTA_PREAMBLE−$X_i$+(preamble_transmission_counter−1)*powerRampingStep, that is, the target receive power of the preamble sequence may be correspondingly decreased by X dB. After such calculation is performed, according to the prior art, PREAMBLE_RECEIVED_TARGET_POWER+PL is also correspondingly decreased by X dB; and a transmit power Power=min{Pmax,PREAMBLE_RECEIVED_TARGET_POWER+PL} [dbm] is calculated. For user equipments whose coverage enhancement requirements are less than or equal to X dB, that is, all users who meet PREAMBLE_RECEIVED_TARGET_POWER+PL−Pmax≤X, because PREAMBLE_RECEIVED_TARGET_POWER+PL has been correspondingly decreased by X dB, in this case, PREAMBLE_RECEIVED_TARGET_POWER+PL is less than Pmax, that is, according to calculation of the formulas, a transmit power is PREAMBLE_RECEIVED_TARGET_POWER+PL. In this way, it may be ensured that receive powers received on a base station side are close to each other and are PREAMBLE_RECEIVED_TARGET_POWER, thereby overcoming a near-far effect. Likewise, all user equipments whose coverage enhancement requirements are less than or equal to X dB perform transmission according to the transmit power: PREAMBLE_RECEIVED_TARGET_POWER+PL, so that a path loss is overcome, a same target receive power is achieved, and no power is wasted.

The foregoing descriptions are merely implementation manners of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

What is claimed is:

1. A method for sending a preamble sequence, the method comprising:
   receiving, by a user equipment, a signal from a base station;
   determining, by the user equipment, a transmit power for sending the preamble sequence, wherein the transmit power meets a following formula:

Power=min{Pmax,PREAMBLE-RECEIVED_TARGET_POWER$_i^{preamble\_transmission\_counter}$+PL} and
   sending, by the user equipment, the preamble sequence according to the determined transmit power,
   wherein Power is the transmit power, Pmax is a maximum transmit power of the user equipment, PL is an uplink path loss obtained by estimating according to a downlink path loss which is determined based on the received signal, PREAMBLE-RECEIVED_TARGET_POWER$_i^{preamble\_transmission\_counter}$ is a target receive power of the preamble sequence and resource pool i is a preamble sequence resource pool for coverage enhancement random access, wherein PREAMBLE_RECEIVED_TARGET_POWER$_i^{preamble\_transmission\_counter}$=preambleInitialReceivedTargetPower+DELTA_PREAMBLE−$X_i$+(preamble_transmission_counter−1)*powerRampingStep, and the preambleInitialReceivedTargetPower is an initial target receive power of the preamble sequence, DELTA_PREAMBLE is a power offset based on a format of the preamble sequence, powerRampingStep is a power ramp step, preamble_transmission_counter is a retransmission count of the preamble sequence, and $X_i$ is a power offset corresponding to the preamble sequence resource pool L.

2. The method according to claim 1, wherein the power offset $X_i$ meets PREAMBLE_RECEIVED_TARGET_POWER*$^{reamble\_transmission\_counter}$+PL−Pmax<$_A$ wherein Δ≥0, and Δ is a constant and a preset threshold.

3. The method according to claim 1, further comprising:
   determining the power offset $X_i$, wherein determining the power offset $X_i$ comprises:
   searching for the power offset X, in ascending order of power offsets, or searching for the power offset X, in ascending order of repetition counts for transmitting the preamble sequence.

4. The method according to claim 1, wherein sending the preamble sequence comprises:
   sending the preamble sequence by using a repetition count corresponding to the preamble sequence resource pool L.

5. The method according to claim 1, wherein the determined transmit power is PREAMBLE-RECEIVED TARGET_POWER$_i^{reamble\_transmission\_counter}$+PL.

6. The method according to claim 1, wherein the power offset Xi corresponds to a repetition count corresponding to the preamble sequence resource pool L.

7. The method according to claim 1, wherein determining a transmit power for sending a preamble sequence comprises:
   obtaining PREAMBLE_RECEIVEDTARGET_POWER$_i^{reamble\_transmissioncounter}$ by performing calculation according to the power offset $X_i$, and sending the preamble sequence according to PREAMBLE_RECEIVEDTARGET_POWER$_i^{reamble\_transmissioncounter}$, to perform the preamble_transmission_counter$^{th}$ random access;
   if the preamble_transmission_counter$^{th}$ random access fails, increasing preamble_transmission_counter by one, keeping $X_i$ unchanged, and calculating the following again:

PREAMBLE-RECEIVED TARGET_POWER$_i^{preamble\_transmission\_counter}$, and if a condition that
   PREAMBLE RECEIVED TARGET_POWER$_i^{preamble\_transmission\_counter}$+PL−P max<$_A$ is met, performing transmission by using a repetition count corresponding to the preamble sequence resource pool i for coverage enhancement random access, wherein the transmit power is PREAMBLE-RECEIVED TARGET_POWER$^{preamble\ transmission\ counter}$+PL; or if a condition that PREAMBLE RECEIVED TARGET POWER$^{preamble\_transmission\_counter}$+PL−Pmax<$_A$ is not net, searching for the power offset X, in ascending order of repetition counts or the power offsets Xi, and determining whether a found power offset X, meets PREAMBLE_RECEIVED_TARGET_POWER$^{preamble}$ $_{-transmission-counter}$+PL−P max<$_{A,\ and\ if}$ a minimum value of X, that meets the foregoing formula is found, performing transmission by using a repetition count corresponding to the preamble sequence resource pool i for coverage enhancement random access, wherein the transmit power is PREAMBLE-RECEIVED TARGET_POWER'T$^{reamble\_transmission\_counter}$+PL; or if the foregoing inequality cannot be met after all X, are traversed, performing transmission by using a repetition count corresponding to a preamble sequence resource pool i for coverage enhancement random access that is found at last, wherein the transmit power is Pmax.

8. The method according to claim 1, wherein information about the preamble sequence resource pool i for coverage enhancement random access is obtained from system information or is preset.

9. The method according to claim 8, wherein the information about the preamble sequence resource pool i for coverage enhancement random access comprises at least one type of the following information:
   a repetition count corresponding to the preamble sequence resource pool i for coverage enhancement random access: or
   a coverage enhancement amount corresponding to the preamble sequence resource pool i for coverage enhancement random access.

10. An apparatus, comprising:
   a memory configured to store instructions; and a processor configured, when executing the instructions, to:
      control a user equipment to receive a signal from a base station; and determine a transmit power for sending a preamble sequence, wherein the transmit power meets a following formula:

Power=min{Pmax, PREAMBLE-RECEIVED_TARGET_POWERƒ$^{reamble\_transmission\_counter}$+PL} and
   a transmitter configured to send the preamble sequence according to the determined transmit power,
      wherein Power is the transmit power, Pmax is a maximum transmit power of the user equipment, PL is an uplink path loss obtained by estimating according to a downlink path loss which is determined based on the received signal,
PREAMBLE-RECEIVED TARGET_POWERY$^{eamble\_transmissioncounter}$ is a target receive power of the preamble sequence, and resource pool i is a preamble sequence resource pool for coverage enhancement random access, wherein PREAMBLE-RECEIVED TARGET_POWER$^{preamble\_transmission\ counter}$=preambleInitialReceivedTargetPower+DELTA PREAMBLE-X,+(preamble_transmission_counter−1)*powerRampingStep, and the preambleInitialReceivedTargetPower is an initial target receive power of the preamble sequence, DELTA_PREAMBLE is a power offset based on a format of the preamble sequence, powerRampingStep is a power ramp step, preamble_transmission_counter is a retransmission count for transmitting the preamble sequence, and A, is a power offset corresponding to the preamble sequence resource pool L.

11. The apparatus according to claim 10, wherein the power offset X, meets:
   PREAMBLE_RECEIVED_TARGET_POWER*$^{reamUe\_ransmission\_coun,er}$+PL−Pmax<$_A$
   wherein A>0 .,and A i$_{s\ a}$ constant and a preset threshold.

12. The apparatus according to claim 10, wherein the processor is further configured to:
   search for the power offset X, in ascending order of power offsets; or
   search for the power offset X, in ascending order of repetition counts for transmitting the preamble sequence.

13. The apparatus according to claim 10, wherein the transmitter is further configured to transmit the preamble sequence by using a repetition count corresponding to the preamble sequence resource pool L.

14. The apparatus according to claim 10, wherein the determined transmit power is:

PREAMBLE-RECEIVED TARGET_POWER$^{rpreamble\_transmission\ counter}$+PL.

15. The apparatus according to claim 10, wherein the power offset X, corresponds to a repetition count corresponding to the preamble sequence resource pool L.

16. The apparatus according to claim 10, wherein processor is configured to:
   obtain PREAMBLE-RECEIVED TARGET_POWER$^{preamble\_transmission\_counter}$ by performing calculation according to the power offset and send the preamble sequence according to PREAMBLE_RECEIVEDTARGET_POWER$^{preamble\_transmissioncounter}$, to perform thepreamble_transmission_counter$^{th}$ random access;
   if the preamble_transmission_counter$^{th}$ random access fails, increase preamble_transmission_counter by one, keep X, unchanged, and calculate the following again:

PREAMBLE-RECEIVED TARGET_POWER$^{ppreamble\_transmission\ counter\_}$;

and
   if a condition that
PREAMBLE RECEIVED TARGET POWER$^{preamble\_ransmission\_coun,er}$+PL−P max<A is met,
   perform transmission by using a repetition count corresponding to the preamble sequence resource pool i for coverage enhancement random access, wherein the transmit power is PREAMBLE-RECEIVED TARGET_POWER$^{preamble\_transmission\ counter}$+PL; or
   if a condition that
PREAMBLE RECEIVED TARGET POWER$^{preamble\_ransmission\_coun,er}$+PL−Pmax<$_A$ is not met, search for the power offset X, in ascending order of repetition counts or the power offsets X$_h$ and determine whether a found power offset X, meets PREAMBLE_RECEIVED_TARGET_POWER*$^{reamUe}$ $_{-ransmission-coun,er}$+PL−Pmax<-, $_{and\ if}$
   a minimum value of X, that meets the foregoing formula is found, perform transmission by using a repetition count corresponding to the preamble sequence resource pool i for coverage enhancement random access, wherein the transmit power is PREAMBLE-RECEIVED TARGET_POWER'T$^{reamble\_transmission\_counter}$+PL; or if the foregoing inequality cannot be met after all X, are traversed, perform transmission by using a repetition count corresponding to a preamble sequence resource pool i for coverage enhancement random access that is found at last, wherein the transmit power is Pmax.

17. The apparatus according to claim 10, wherein information about the preamble sequence resource pool i for coverage enhancement random access is obtained from system information or is preset.

18. The apparatus according to claim 17, wherein the information about the preamble sequence resource pool i for coverage enhancement random access comprises at least one type of the following information:
   a repetition count corresponding to the preamble sequence resource pool i for coverage enhancement random access: or
   a coverage enhancement amount corresponding to the preamble sequence resource pool i for coverage enhancement random access.

19. A non-transitory computer-readable medium having program instructions recorded thereon, wherein, when executed by a processor of a terminal device, the instructions cause the terminal device to:
   receive a signal from a base station;
   determine a transmit power for sending a preamble sequence, wherein the transmit power meets the following formula:
   Power=min{Pmax, PREAMBLE$_{13}$ RECEIVED$_{13}$ TARGET$_{13}$ POWER$^{preamble\_transmission\ counter}$+PL}; and send the preamble sequence according to the determined transmit power, wherein Power is the determined transmit power, Pmax is a maximum transmit power of user equipment, PL is an uplink path loss obtained by estimating according to a downlink path loss which is determined based on the received signal, PREAMBLE-RECEIVED TARGET_POWER$^{preamble\_transmission\_counter}$ is a target receive power of the preamble sequence, and resource pool i is a preamble sequence resource pool for coverage enhancement random access, wherein PREAMBLE RECEIVED TARGET POWER$^{preamble\_transmission\ counter}$=preambleInitialReceivedTargetPower+DELIAPREAMBLE−$X_i$+{preamble_transmission_counter−1)*powerRampingStep, and preambleInitialReceivedTargetPower is an initial target receive power of the preamble sequence, DELTA_PREAMBLE is a power offset based on a format of the preamble sequence, powerRampingStep is a power ramp step, preamble_transmission_counter is a retransmission count of the preamble sequence, and A, is a power offset corresponding to the preamble sequence resource pool i.

20. The non-transitory computer-readable medium according to claim 19, wherein the power offset $X_i$ corresponds to a repetition count corresponding to the preamble sequence resource pool i.

* * * * *

UNITED STATES PATENT AND TRADEMARK OFFICE
CERTIFICATE OF CORRECTION

PATENT NO. : 10,212,668 B2
APPLICATION NO. : 15/018348
DATED : February 19, 2019
INVENTOR(S) : Deping Liu Page 1 of 6

It is certified that error appears in the above-identified patent and that said Letters Patent is hereby corrected as shown below:

Column 27, Line 52, Delete the text beginning with "1. A method for sending" to and ending "sequence resource pool i." in Column 32, Line 27, and insert the following claims:

-- 1. A method for sending a preamble sequence, the method comprising:
  receiving, by a user equipment, a signal from a base station;
  determining, by the user equipment, a transmit power for sending the preamble sequence, wherein the transmit power meets a following formula:
  $Power = \min\{P\max, PREAMBLE\_RECEIVED\_TARGET\_POWER_i^{preamble\_transmission\_counter} + PL\}$; and
  sending, by the user equipment, the preamble sequence according to the determined transmit power,
  wherein $Power$ is the transmit power, $P\max$ is a maximum transmit power of the user equipment, $PL$ is an uplink path loss obtained by estimating according to a downlink path loss which is determined based on the received signal, $PREAMBLE\_RECEIVED\_TARGET\_POWER_i^{preamble\_transmission\_counter}$ is a target receive power of the preamble sequence, and resource pool i is a preamble sequence resource pool for coverage enhancement random access, wherein
  $PREAMBLE\_RECEIVED\_TARGET\_POWER_i^{preamble\_transmission\_counter} =$
  $preambleInitialReceivedTargetPower + DELTA\_PREAMBLE - X_i +$
  $(preamble\_transmission\_counter - 1) * powerRampingStep$, and
  the $preambleInitialReceivedTargetPower$ is an initial target receive power of the preamble sequence, $DELTA\_PREAMBLE$ is a power offset based on a format of the preamble sequence, $powerRampingStep$ is a power ramp step, $preamble\_transmission\_counter$ is a retransmission count of the preamble sequence, and $X_i$ is a power offset corresponding to the preamble sequence resource pool i.

2. The method according to claim 1, wherein the power offset $X_i$ meets

Signed and Sealed this
Twentieth Day of August, 2019

Andrei Iancu
*Director of the United States Patent and Trademark Office*

$$PREAMBLE\_RECEIVED\_TARGET\_POWER_i^{preamble\_transmission\_counter} + PL - P\,max \leq \Delta,$$
wherein $\Delta \geq 0$, and $\Delta$ is a constant and a preset threshold.

3. The method according to claim 1, further comprising:
    determining the power offset $X_i$, wherein determining the power offset $X_i$ comprises:
        searching for the power offset $X_i$ in ascending order of power offsets, or
        searching for the power offset $X_i$ in ascending order of repetition counts for
            transmitting the preamble sequence.

4. The method according to claim 1, wherein sending the preamble sequence comprises:
    sending the preamble sequence by using a repetition count corresponding to the preamble
        sequence resource pool i.

5. The method according to claim 1, wherein the determined transmit power is
$$PREAMBLE\_RECEIVED\_TARGET\_POWER_i^{preamble\_transmission\_counter} + PL.$$

6. The method according to claim 1, wherein the power offset $X_i$ corresponds to a repetition count corresponding to the preamble sequence resource pool i.

7. The method according to claim 1, wherein determining a transmit power for sending a preamble sequence comprises:
    obtaining $PREAMBLE\_RECEIVED\_TARGET\_POWER_i^{preamble\_transmission\_counter}$ by
        performing calculation according to the power offset $X_i$, and sending the preamble
        sequence according to $PREAMBLE\_RECEIVED\_TARGET\_POWER_i^{preamble\_transmission\_counter}$,
        to perform the *preamble_transmission_counter*$^{th}$ random access;
    if the *preamble_transmission_counter*$^{th}$ random access fails, increasing
        *preamble_transmission_counter* by one, keeping $X_i$ unchanged, and calculating the
        following again:
        $PREAMBLE\_RECEIVED\_TARGET\_POWER_i^{preamble\_transmission\_counter}$; and
    if a condition that $PREAMBLE\_RECEIVED\_TARGET\_POWER_i^{preamble\_transmission\_counter} + PL -$
        $P\,max \leq \Delta$ is met, performing transmission by using a repetition count corresponding
        to the preamble sequence resource pool i for coverage enhancement random access,
        wherein the transmit power is
        $PREAMBLE\_RECEIVED\_TARGET\_POWER_i^{preamble\_transmission\_counter} + PL$; or
    if a condition that $PREAMBLE\_RECEIVED\_TARGET\_POWER_i^{preamble\_transmission\_counter} + PL -$
        $P\,max \leq \Delta$ is not met, searching for the power offset $X_i$ in ascending order of
        repetition counts or the power offsets $X_i$, and determining whether a found power
        offset $X_i$ meets
        $PREAMBLE\_RECEIVED\_TARGET\_POWER_i^{preamble\_transmission\_counter} + PL - P\,max \leq \Delta$;
        and
    if a minimum value of $X_i$ that meets the foregoing formula is found, performing transmission
        by using a repetition count corresponding to the preamble sequence resource pool i

CERTIFICATE OF CORRECTION (continued)

for coverage enhancement random access, wherein the transmit power is
$PREAMBLE\_RECEIVED\_TARGET\_POWER_i^{preamble\_transmission\_counter} + PL$;
or if the foregoing inequality cannot be met after all $X_i$ are traversed, performing transmission by using a repetition count corresponding to a preamble sequence resource pool i for coverage enhancement random access that is found at last, wherein the transmit power is $P$max.

8. The method according to claim 1, wherein information about the preamble sequence resource pool i for coverage enhancement random access is obtained from system information or is preset.

9. The method according to claim 8, wherein the information about the preamble sequence resource pool i for coverage enhancement random access comprises at least one type of the following information:
    a repetition count corresponding to the preamble sequence resource pool i for coverage enhancement random access; or
    a coverage enhancement amount corresponding to the preamble sequence resource pool i for coverage enhancement random access.

10. An apparatus, comprising:
    a memory configured to store instructions; and
    a processor configured, when executing the instructions, to:
        control a user equipment to receive a signal from a base station; and
        determine a transmit power for sending a preamble sequence, wherein the transmit power meets a following formula:
        $Power =$ $$\min\{P\max, PREAMBLE\_RECEIVED\_TARGET\_POWER_i^{preamble\_transmission\_counter} + PL\};$$

and
    a transmitter configured to send the preamble sequence according to the determined transmit power,
    wherein *Power* is the transmit power, $P$max is a maximum transmit power of the user equipment, *PL* is an uplink path loss obtained by estimating according to a downlink path loss which is determined based on the received signal,
$PREAMBLE\_RECEIVED\_TARGET\_POWER_i^{preamble\_transmission\_counter}$ is a target receive power of the preamble sequence, and resource pool i is a preamble sequence resource pool for coverage enhancement random access, wherein
$PREAMBLE\_RECEIVED\_TARGET\_POWER_i^{preamble\_transmission\_counter} =$

*preambleInitialReceivedTargetPower* + *DELTA_PREAMBLE*-$X_i$ +

(*preamble_transmission_counter* -1)\* *powerRampingStep*, and
the *preambleInitialReceivedTargetPower* is an initial target receive power of the preamble sequence, *DELTA_PREAMBLE* is a power offset based on a format of the preamble sequence, *powerRampingStep* is a power ramp step,
    *preamble_transmission_counter* is a retransmission count for transmitting the preamble sequence, and $X_i$ is a power offset corresponding to the preamble sequence resource pool i.

11. The apparatus according to claim 10, wherein the power offset $X_i$ meets:
$$PREAMBLE\_RECEIVED\_TARGET\_POWER_i^{preamble\_transmission\_counter} + PL - P\max \leq \Delta,$$
wherein $\Delta \geq 0$, and $\Delta$ is a constant and a preset threshold.

12. The apparatus according to claim 10, wherein the processor is further configured to:
    search for the power offset $X_i$ in ascending order of power offsets; or
    search for the power offset $X_i$ in ascending order of repetition counts for transmitting the preamble sequence.

13. The apparatus according to claim 10, wherein the transmitter is further configured to transmit the preamble sequence by using a repetition count corresponding to the preamble sequence resource pool i.

14. The apparatus according to claim 10, wherein the determined transmit power is:
$$PREAMBLE\_RECEIVED\_TARGET\_POWER_i^{preamble\_transmission\_counter} + PL.$$

15. The apparatus according to claim 10, wherein the power offset $X_i$ corresponds to a repetition count corresponding to the preamble sequence resource pool i.

16. The apparatus according to claim 10, wherein processor is configured to:
    obtain $PREAMBLE\_RECEIVED\_TARGET\_POWER_i^{preamble\_transmission\_counter}$ by performing calculation according to the power offset $X_i$, and send the preamble sequence according to $PREAMBLE\_RECEIVED\_TARGET\_POWER_i^{preamble\_transmission\_counter}$, to perform the *preamble_transmission_counter*[th] random access;
    if the *preamble_transmission_counter*[th] random access fails, increase *preamble_transmission_counter* by one, keep $X_i$ unchanged, and calculate the following again:
    $PREAMBLE\_RECEIVED\_TARGET\_POWER_i^{preamble\_transmission\_counter}$; and
    if a condition that $PREAMBLE\_RECEIVED\_TARGET\_POWER_i^{preamble\_transmission\_counter} + PL - P\max \leq \Delta$ is met, perform transmission by using a repetition count corresponding to the preamble sequence resource pool i for coverage enhancement random access, wherein the transmit power is
    $PREAMBLE\_RECEIVED\_TARGET\_POWER_i^{preamble\_transmission\_counter} + PL$; or
    if a condition that $PREAMBLE\_RECEIVED\_TARGET\_POWER_i^{preamble\_transmission\_counter} + PL - P\max \leq \Delta$ is not met, search for the power offset $X_i$ in ascending order of repetition counts or the power offsets $X_i$, and determine whether a found power offset $X_i$ meets $$PREAMBLE\_RECEIVED\_TARGET\_POWER_i^{preamble\_transmission\_counter} + PL - P\max \leq \Delta;$$

and if a minimum value of $X_i$ that meets the foregoing formula is found, perform transmission by using a repetition count corresponding to the preamble sequence resource pool i for coverage enhancement random access, wherein the transmit power is $PREAMBLE\_RECEIVED\_TARGET\_POWER_i^{preamble\_transmission\_counter} + PL$; or if the foregoing inequality cannot be met after all $X_i$ are traversed, perform transmission by using a repetition count corresponding to a preamble sequence resource pool i for coverage enhancement random access that is found at last, wherein the transmit power is $P$max.

17. The apparatus according to claim 10, wherein information about the preamble sequence resource pool i for coverage enhancement random access is obtained from system information or is preset.

18. The apparatus according to claim 17, wherein the information about the preamble sequence resource pool i for coverage enhancement random access comprises at least one type of the following information:
- a repetition count corresponding to the preamble sequence resource pool i for coverage enhancement random access; or
- a coverage enhancement amount corresponding to the preamble sequence resource pool i for coverage enhancement random access.

19. A non-transitory computer-readable medium having program instructions recorded thereon, wherein, when executed by a processor of a terminal device, the instructions cause the terminal device to:
- receive a signal from a base station;
- determine a transmit power for sending a preamble sequence, wherein the transmit power meets the following formula:
$$Power = \min\{P\max, PREAMBLE\_RECEIVED\_TARGET\_POWER_i^{preamble\_transmission\_counter} + PL\};$$
and
- send the preamble sequence according to the determined transmit power,
- wherein *Power* is the determined transmit power, $P$max is a maximum transmit power of user equipment, $PL$ is an uplink path loss obtained by estimating according to a downlink path loss which is determined based on the received signal, $PREAMBLE\_RECEIVED\_TARGET\_POWER_i^{preamble\_transmission\_counter}$ is a target receive power of the preamble sequence, and resource pool i is a preamble sequence resource pool for coverage enhancement random access, wherein
$$PREAMBLE\_RECEIVED\_TARGET\_POWER_i^{preamble\_transmission\_counter} =$$
*preambleInitialReceivedTargetPower* + *DELTA_PREAMBLE*- $X_i$ + (*preamble_transmission_counter*–1)\* *powerRampingStep*, and
*preambleInitialReceivedTargetPower* is an initial target receive power of the preamble sequence, *DELTA_PREAMBLE* is a power offset based on a format of the preamble sequence, *powerRampingStep* is a power ramp step,

*preamble_transmission_counter* is a retransmission count of the preamble sequence, and $X_i$ is a power offset corresponding to the preamble sequence resource pool i.

20. The non-transitory computer-readable medium according to claim 19, wherein the power offset $X_i$ corresponds to a repetition count corresponding to the preamble sequence resource pool i.--